US011793271B2

(12) United States Patent
Case et al.

(10) Patent No.: US 11,793,271 B2
(45) Date of Patent: Oct. 24, 2023

(54) MIDSOLE SYSTEM WITH GRADED RESPONSE

(71) Applicant: NIKE, Inc., Beaverton, OR (US)

(72) Inventors: Patrick Case, Portland, OR (US); Zachary M. Elder, Portland, OR (US); Lee D. Peyton, Tigard, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 17/579,693

(22) Filed: Jan. 20, 2022

(65) Prior Publication Data

US 2022/0132987 A1 May 5, 2022

Related U.S. Application Data

(60) Continuation of application No. 16/866,809, filed on May 5, 2020, now Pat. No. 11,259,596, which is a (Continued)

(51) Int. Cl.
*A43B 13/20* (2006.01)
*A43B 1/00* (2006.01)
(Continued)

(52) U.S. Cl.
CPC ............ *A43B 13/20* (2013.01); *A43B 1/0009* (2013.01); *A43B 3/0042* (2013.01); *A43B 3/0057* (2013.01); *A43B 5/00* (2013.01); *A43B 13/023* (2013.01); *A43B 13/04* (2013.01); *A43B 13/125* (2013.01); *A43B 13/127* (2013.01); *A43B 13/145* (2013.01); *A43B 13/146* (2013.01); *A43B 13/186* (2013.01); *A43B 13/206* (2013.01); *B32B 1/00* (2013.01);
(Continued)

(58) Field of Classification Search
CPC ...... A43B 13/20; A43B 13/203; A43B 13/206
See application file for complete search history.

(56) References Cited

U.S. PATENT DOCUMENTS

| | | | | |
|---|---|---|---|---|
| 3,300,880 A * | 1/1967 | Campagna | A43B 3/10 | 36/44 |
| 4,063,371 A * | 12/1977 | Batra | A43B 7/06 | 36/3 B |

(Continued)

FOREIGN PATENT DOCUMENTS

| | | |
|---|---|---|
| CN | 1133149 A | 10/1996 |
| KR | 100741628 B1 | 7/2007 |
| WO | 2012094379 A1 | 7/2012 |

*Primary Examiner* — Ted Kavanaugh
(74) *Attorney, Agent, or Firm* — Quinn IP Law

(57) ABSTRACT

A sole structure for an article of footwear comprises a midsole system with a plurality of cushioning units, each having multiple cushioning layers configured to work together as a system to absorb a compressive load, such as a dynamic compressive load due to impact with the ground, in stages of progressive cushioning according to the relative stiffness values of the layers. Various midsole systems disclosed include isolated cushioning units, linked cushioning units, sole layers having stanchions interfacing with the midsole system, midsole systems with sole layers having keyed and unkeyed portions overlying a bladder, and midsole systems with vertically-stacked cushioning units disposed in inverted relationship to one another.

13 Claims, 20 Drawing Sheets

Related U.S. Application Data division of application No. 15/983,539, filed on May 18, 2018, now Pat. No. 10,645,996.

(60) Provisional application No. 62/510,002, filed on May 23, 2017.

(51) Int. Cl.

| | |
|---|---|
| ***A43B 3/00*** | (2022.01) |
| ***A43B 13/18*** | (2006.01) |
| ***A43B 13/14*** | (2006.01) |
| ***A43B 13/02*** | (2022.01) |
| ***A43B 5/00*** | (2022.01) |
| ***B32B 1/00*** | (2006.01) |
| ***B32B 3/28*** | (2006.01) |
| ***B32B 27/08*** | (2006.01) |
| ***A43B 13/04*** | (2006.01) |
| ***A43B 13/12*** | (2006.01) |

(52) U.S. Cl.

CPC ................ *B32B 3/28* (2013.01); *B32B 27/08* (2013.01); *B32B 2250/24* (2013.01); *B32B 2437/02* (2013.01)

(56) References Cited

U.S. PATENT DOCUMENTS

| | | | | | |
|---|---|---|---|---|---|
| 4,183,156 | A * | 1/1980 | Rudy | A43B 13/40 36/44 |
| 4,219,945 | A * | 9/1980 | Rudy | A43B 13/40 36/44 |
| 5,363,570 | A * | 11/1994 | Allen | A43B 13/20 36/35 B |
| 5,533,280 | A | 7/1996 | Halliday | |
| 5,987,780 | A | 11/1999 | Lyden et al. | |
| 6,402,879 | B1 * | 6/2002 | Tawney | A43B 13/20 36/35 R |
| 6,510,624 | B1 * | 1/2003 | Lakic | A43B 17/035 36/28 |
| 2012/0167413 | A1 | 7/2012 | Marvin et al. | |
| 2016/0073732 | A1 | 3/2016 | Ernst et al. | |

* cited by examiner

MIDSOLE SYSTEM WITH GRADED RESPONSE

CROSS-REFERENCE TO RELATED APPLICATIONS

This application is a continuation of U.S. application Ser. No. 16/866,809, filed on May 5, 2020, which is a divisional of U.S. application Ser. No. 15/983,539, filed on May 18, 2018, now U.S. Pat. No. 10,645,996, issued May 12, 2020, which claims the benefit of priority to U.S. Provisional Application No. 62/510,002 filed May 23, 2017, and all of which are hereby incorporated by reference in their entirety.

TECHNICAL FIELD

The present teachings generally include a sole structure for an article of footwear including a midsole system.

BACKGROUND

An article of footwear typically includes a sole structure configured to be located under a wearer's foot to space the foot away from the ground. Sole structures in athletic footwear are typically configured to provide cushioning, motion control, and/or resilience.

DESCRIPTION

Figure 1:
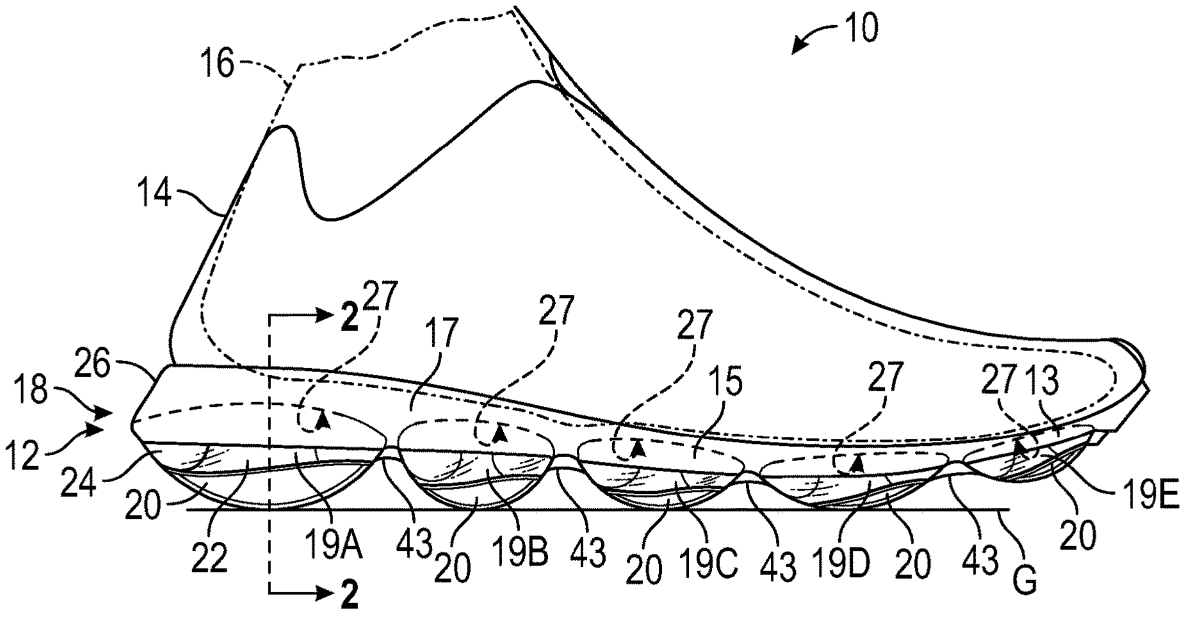
FIG. 1 is a schematic illustration in side view of an article of footwear having a sole structure with a midsole system that has multiple cushioning units.

Various footwear sole structures with midsole systems are disclosed, each with multiple cushioning layers configured to work together as a system to absorb a compressive load, such as a dynamic compressive load due to impact with the ground, in stages of progressive cushioning (referred to as staged or graded cushioning) according to the relative stiffness values of the layers. Underfoot loads are "dosed" or "staged" to the wearer, with each stage having a different effective stiffness. The progressive cushioning may be correlated with different regions of the sole structure, such as by providing an initial stiffness response in the heel region at heel impact, with a stiffness that increases as the foot moves forward to toe-off at the forefoot region. For example, the sole structure may provide first, second and third stages of compression, in order, each providing a different stiffness, with the third stage being the stiffest. Because the third stage of compression occurs after the first and second stages, it may coincide with movement of the article of footwear to a dorsiflexed position in which the wearer is near a final toe-off.

The cushioning response is therefore staged not only in relation to absorption of the initial impact force, but also in relation to the forward roll of the foot from heel to toe. In one example, the midsole system initially provides a low, linear rate of change of load to displacement (i.e., compressive stiffness), followed by a higher, possibly nonlinear rate, and then a more rapid, exponentially increasing rate. The sole structure provides the graded cushioning while being lightweight and flexible. Moreover, various embodiments may exhibit an unloading behavior (i.e., behavior when the dynamic compressive force is removed) that provides significant energy return.

In one or more embodiments, a sole structure includes a midsole system that has multiple cushioning units, each with multiple cushioning layers of sealed chambers containing gas. Each cushioning unit includes a first cushioning layer comprising a first sealed chamber, and a second cushioning layer comprising a second sealed chamber. The first sealed chamber and the second sealed chamber each retain gas in isolation from one another. The first cushioning layer underlies the second cushioning layer and has a domed lower surface extending away from the second cushioning layer. The second cushioning layer is annular and borders a central portion of the first cushioning layer above the domed lower surface.

The multiple cushioning units may be arranged in different regions of the sole structure to provide a graded stiffness response. In some embodiments, the plurality of cushioning units includes interconnected cushioning units having fluid communication between the second sealed chamber of each of the interconnected cushioning units. The fluid connection may be accomplished by channels connecting the chambers, or by linking chambers, as discussed herein. For example, cushioning units in the heel region may be fluidly interconnected with other cushioning units in the heel region and/or in one or more other regions, such as the midfoot region and forefoot region. By fluidly interconnecting the cushioning units, a compressive force applied to one region of the sole structure affects pressure in the second sealed chambers of the interconnected units. For example, a compressive force in the heel region can displace some of the gas from the cushioning unit(s) in the heel region to cushioning units forward of the heel region via the interconnected second sealed chambers. This effectively preloads the second chambers of cushioning units forward of the heel region to provide a stiffer response upon compression of the second sealed chamber.

In some embodiments, the sole structure has a heel region, a forefoot region, and a midfoot region between the heel region and the forefoot region, and the interconnected cushioning units are disposed in the heel region and the midfoot region and are arranged in a serpentine shape. For example, the serpentine shape may wind toward the lateral side, then toward the medial side in progressing forward from the heel region, tracking the loading pattern of a typical foot strike and forward roll.

The interconnected cushioning units may be disposed in one or more regions of the sole structure. For example, in one or more embodiments, the sole structure has a heel region, a forefoot region, and a midfoot region between the heel region and the forefoot region, and the interconnected cushioning units are disposed in the forefoot region.

In some embodiments, the sole structure may include different groups of the interconnected cushioning units, each group isolated from the other group or groups. For example, the plurality of cushioning units may include a first group of interconnected cushioning units in the forefoot region having fluid communication between the second sealed chamber of each of the interconnected cushioning units, and a second group of interconnected cushioning units disposed in the heel region and the midfoot region, the second group fluidly-isolated from the first group and having fluid communication between the second sealed chamber of each of the interconnected cushioning units of the second group. The first group may thus be configured with a different stiffness profile than the second group, as may be beneficial for providing soft cushioning at heel strike and a stiffer support at toe-off. In some embodiments, the second group of interconnected cushioning units may be arranged in a serpentine shape. This allows the fluid in the interconnected second chambers of the second group to displace forward in correspondence with the forward progression of foot loading, providing a relatively stiffer second chamber in forward ones of the interconnected cushioning units.

Some embodiments of midsole systems with interconnected cushioning units may include one or more linking chambers. At least some of the interconnected cushioning units laterally surround the linking chamber, with the second sealed chamber of each laterally-surrounding interconnected cushioning unit in fluid communication with the linking chamber.

In some embodiments, at least some of the multiple cushioning units are fluidly-isolated from one another in order to achieve a desired cushioning response. For example, the plurality of cushioning units may include multiple isolated cushioning units each disposed adjacent a periphery of the sole structure, and each fluidly-isolated from all other ones of the plurality of cushioning units. Optionally, interconnected cushioning units may be disposed inward of the isolated cushioning units relative to the periphery. Stated differently, the multiple isolated cushioning units may be disposed between the periphery and the interconnected cushioning units. Such an arrangement enables each peripheral cushioning unit to maintain a stiffness response independent of the progression of foot loading. For example, each peripheral cushioning unit may be configured and pressurized to provide a relatively stiff response, providing stability to discourage overpronation and/or underpronation (supination).

In some embodiments in which the cushioning units have the domed lower surface, the midsole system comprises a first polymeric sheet, a second polymeric sheet, and a third polymeric sheet. The first polymeric sheet and the second polymeric sheet define the first sealed chamber of each of the plurality of cushioning units, and the first polymeric sheet defines the domed lower surface of each of the plurality of cushioning units. The second polymeric sheet and the third polymeric sheet define the second sealed chamber of each of the plurality of cushioning units, and the second polymeric sheet and the third polymeric sheet are bonded to one another at bonds each of which extends over the central portion of the first sealed chamber of a respective one of the plurality of cushioning units and is bordered by the second sealed chamber of the respective one of the plurality of cushioning units.

In one or more embodiments, the midsole system may further comprise a third cushioning layer overlying the plurality of cushioning units. A lower surface of the third cushioning layer has a plurality of recesses shaped such that the plurality of cushioning units are nested in the third cushioning layer at the plurality of recesses. For example, the third cushioning layer may be foam, with downward-facing recesses that cup portions of the top surface of the cushioning units, nesting the cushioning units from above.

In one or more embodiments, the sole structure may further comprise an additional cushioning layer underlying the plurality of cushioning units. The additional cushioning layer may be another layer of the midsole system, or may be an outsole, or a combination of a midsole layer and an outsole. The additional cushioning layer includes a plurality of stanchions, and each stanchion interfaces with the domed lower surface of a respective one of the plurality of cushioning units. For example, the stanchions may extend generally upward. At least some of the plurality of stanchions may have concave upper surfaces each of which cups at least a portion of the domed lower surface of the respective one of the plurality of cushioning units. Accordingly, the stanchions are spaced apart from one another in correspondence with relative spacing of the cushioning units such that the stanchions can interface with the cushioning units in a one-to-one ratio. Under compressive loading of a cushioning unit, the domed lower surface of the first cushioning layer is compressed against the stanchion.

The stanchions may be configured to affect the cushioning response of the sole structure as the foot moves forward from heel to toe. For example, in one or more embodiments, the plurality of stanchions may decrease in height, increase in width, or both, from the heel region to the forefoot region. Generally, a narrower stanchion relative to a domed lower surface of a cushioning unit will cause more of the first cushioning layer to collapse over the stanchion, isolating loading to the first cushioning layer for a greater range of displacement (compression) than a wider stanchion. A narrower stanchion relative to the domed lower surface may provide a softer (less stiff) initial loading response. Similarly, a shorter stanchion allows less displacement of the cushioning unit prior to the domed lower surface of the cushioning unit bottoming out relative to the stanchion, providing a stiffer initial loading response relative to a taller stanchion. Additionally, the interface area of the stanchion (where it cups the domed lower surface) to the total area of the domed lower surface governs how the first cushioning layer can deform (compress). Generally, a larger ratio of the interface area of the stanchion to the total area of the domed lower surface results in a stiffer response of the cushioning unit by minimizing the ability of the first cushioning layer to deform over the stanchion. In one or more embodiments, a ratio of stanchion interface area to total area of the domed lower surface for each of the plurality of cushioning units may be greater on average for the forefoot cushioning units interfacing with the forefoot stanchions than for the heel cushioning units interfacing with the heel stanchions. Accordingly, the less stiff first cushioning layer affects cushioning over a greater range of displacement in the heel region than in the forefoot region, providing a relatively stiffer response in the forefoot region, as is appropriate for supporting toe-off.

In one or more embodiments, a sole structure for an article of footwear comprises a midsole system having a bladder comprising four stacked polymeric sheets bonded to one another and defining a first cushioning layer, a second cushioning layer, and a third cushioning layer, each cushioning layer comprising a sealed chamber retaining gas in isolation from each other sealed chamber. The midsole system further comprises a sole layer overlying the bladder and configured with a bottom surface having an outer peripheral portion and a central portion surrounded by the outer peripheral portion. The outer peripheral portion is mated with an upper surface of the bladder in an unloaded state of the sole structure, and the central portion is at least partially spaced apart from the upper surface of the bladder in the unloaded state of the sole structure. Stated differently, the outer peripheral portion is "keyed" to the corresponding outer peripheral portion of the bladder, while the central portion is not keyed to the bladder. This configuration allows greater displacement of the bladder relative to the central portion than the peripheral portion under compressive loading. A greater stiffness profile may thus be achieved at the peripheral portion, in order to provide stability to counteract foot tendencies for overpronation and supination. The central portion, in contrast, may achieve a softer (less stiff) initial cushioning response, presenting a soft ride to the majority of the foot. The bladder will conform to the central portion of the bottom surface of the sole layer after the initial stage of compressive loading.

In addition to the bladder and the overlying sole layer with the keyed peripheral portion, the sole structure may further comprise an underlying sole layer, such as an outsole or an additional midsole layer, which underlies the bladder. An upper surface of the underlying sole layer is mated with a bottom surface of the bladder in both the unloaded state and under compressive loading of the sole structure.

In one or more embodiments, a sole structure for an article of footwear comprises a midsole system having a first cushioning unit and a second cushioning unit, each cushioning unit including a first cushioning layer comprising a first sealed chamber, and a second cushioning layer comprising a second sealed chamber. The first sealed chamber and the second sealed chamber each retain gas in isolation from one another. The first cushioning unit is inverted and the second cushioning unit is stacked on the first cushioning unit such that the first cushioning layer of the first cushioning unit interfaces with and underlies the first cushioning layer of the second cushioning unit. In embodiments in which the first cushioning layer is less stiff than the second cushioning layer, such as when the pressure of the gas in the first cushioning layer is less than the pressure of the gas in the second sealed chamber in an unloaded state, stacking the cushioning units so that the least stiff first cushioning layers interface with one another may allow a greater range of displacement of the sole structure in an initial (first) stage of compression that is affected only by the least stiff first cushioning layers.

Such a stacked arrangement of cushioning units may be implemented with various configurations of cushioning units. For example, the cushioning units may be those described above in which the first cushioning layer of each cushioning unit has a domed surface extending away from the second cushioning layer, and the second cushioning layer is annular and borders a central portion of the first cushioning layer. In such a configuration, the domed surface of the first cushioning unit interfaces with the domed surface of the second cushioning unit.

In another alternative, the stacked arrangement of cushioning units may be implemented in a configuration in which each cushioning unit has four stacked polymeric sheets bonded to one another to define the first sealed chamber bounded by the first polymeric sheet and the second polymeric sheet, the second sealed chamber bounded by the second polymeric sheet and the third polymeric sheet, and a third sealed chamber bounded by the third polymeric sheet and the fourth polymeric sheet.

The above features and advantages and other features and advantages of the present teachings are readily apparent from the following detailed description of the modes for carrying out the present teachings when taken in connection with the accompanying drawings.

Figure 9:
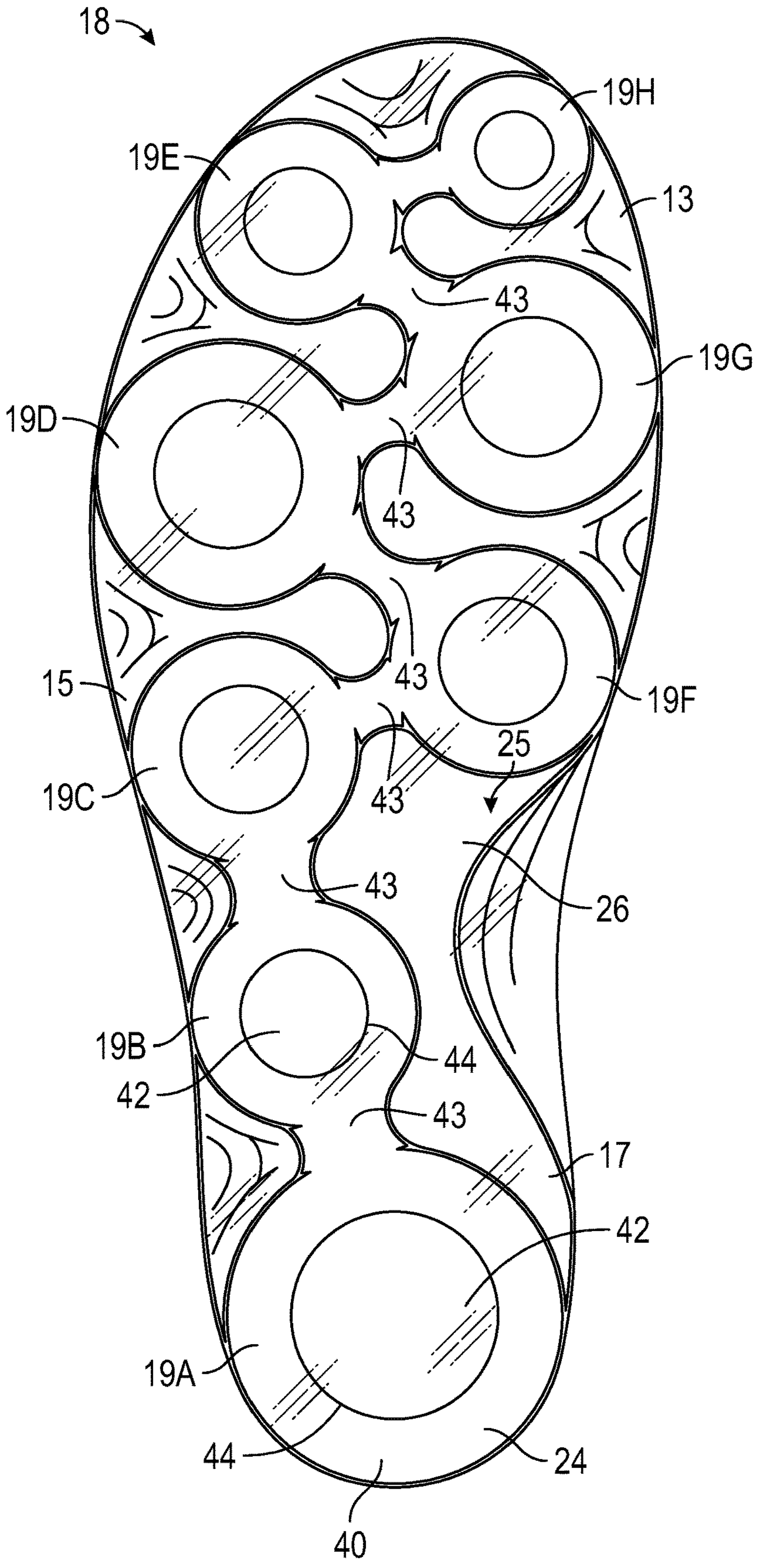
FIG. 9 is a schematic illustration in bottom view of the midsole system of the article of footwear of FIG. 1.

Referring to the drawings wherein like reference numbers refer to like components throughout the views, FIG. 1 shows an article of footwear 10. The article of footwear 10 includes a sole structure 12 and an upper 14 secured to the sole structure 12. The upper 14 is configured to receive and retain a foot 16 so that the foot 16 is supported on the sole structure 12 with the sole structure 12 positioned below the foot 16, and between the foot 16 and the ground, which is represented by a ground surface G. As discussed herein, the sole structure 12 includes a midsole system 18 that has multiple cushioning units 19, each cushioning unit having multiple cushioning layers disposed relative to one another such that the midsole system 18 absorbs a dynamic compressive load (such as due to impact with the ground) in stages of progressive cushioning in a sequence according to the relative stiffness of the cushioning layers. As used herein, "stiffness" of a cushioning layer is the ratio of change in compressive load (e.g., force in Newtons) to displacement of the cushioning layer (e.g., displacement in millimeters along the axis of the compressive load). An outsole 20 is secured to the midsole system 18 as described herein. FIG. 9 is a bottom view of the midsole system 18, with the outsole 20 removed. FIG. 9 shows that the midsole system 18 has eight cushioning units 19A, 19B, 19C, 19D, 19E, 19F, 19G, 19H. The cushioning units 19A-19H are referred to with reference numeral 19 when discussing features common to each of the cushioning units 19A-19H. In the embodiment of FIG. 9, each of the cushioning units 19A-19H is in fluid communication with each of the other cushioning units via channels 43 that interconnect the respective second cushioning layer 24 of adjacent ones of the cushioning units. As further discussed herein, the fluid interconnection allows gas within the second sealed chambers 40 of the fluidly-interconnected cushioning units 19 in the heel region to be displaced to the cushioning units in the midfoot region and, if interconnected, to the forefoot region following, for example, a heel strike, increasing stiffness of the midfoot and forefoot cushioning units as the foot rolls forward to toe-off. In other embodiments shown and discussed herein, some or all of the cushioning units 19 may instead be fluidly-isolated from some or all of the other cushioning units.

Figure 2:
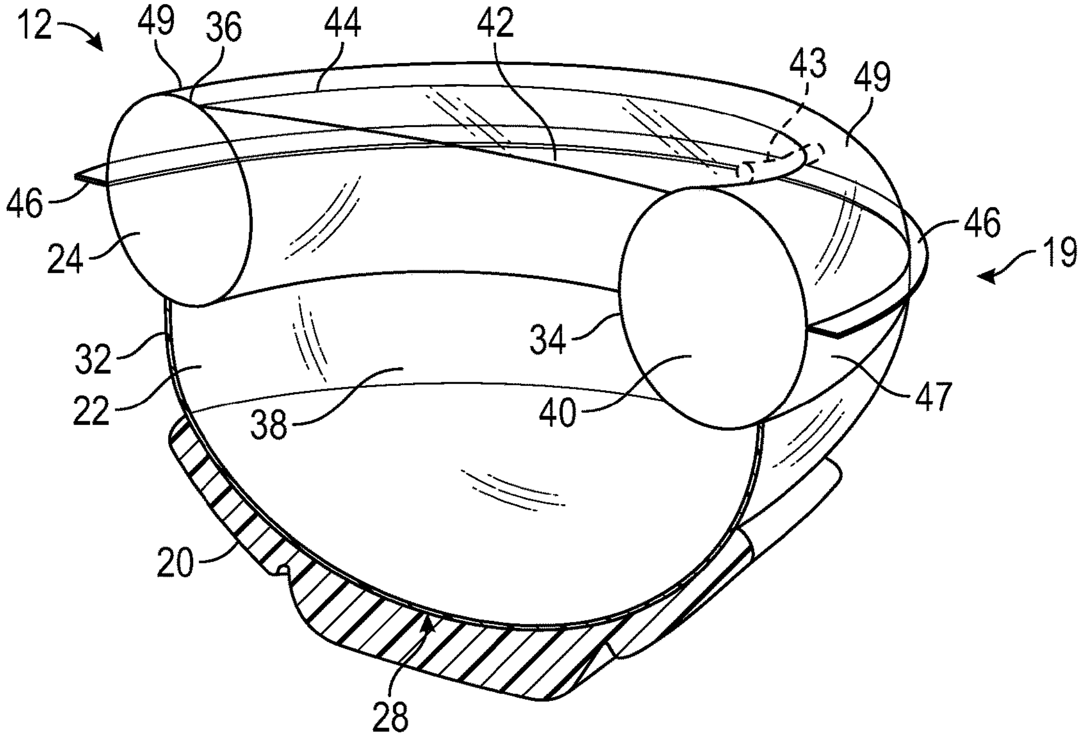
FIG. 2 is a schematic illustration in cross-sectional perspective view of a portion of the sole structure of the article of footwear of FIG. 1 taken at lines 2-2 in FIG. 1 showing one of the cushioning units.
Figure 4:
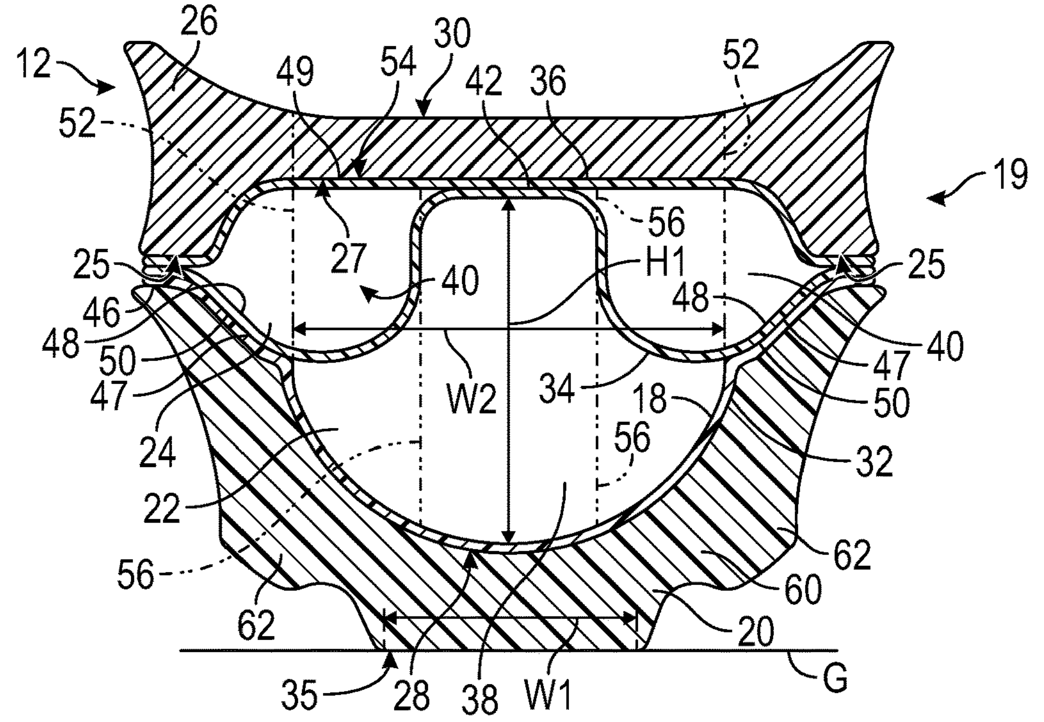
FIG. 4 is a schematic illustration in cross-sectional view of the portion of the sole structure of FIG. 2 showing a third cushioning layer.

With reference to FIGS. 2 and 4, a single one of the cushioning units 19 of the midsole system 18 is shown. The cushioning unit 19 includes a first cushioning layer 22, a second cushioning layer 24, and a third cushioning layer 26. As is evident in FIGS. 1 and 9, the third cushioning layer 26 extends in a forefoot region 13, a midfoot region 15, and a heel region 17 of the midsole system 18. The midfoot region 15 is between the heel region 17 and the forefoot region 13. As is understood by those skilled in the art, the forefoot region 13 generally underlies the toes and metatarsal-phalangeal joints of an overlying foot 16. The midfoot region 15 generally underlies the arch region of the foot 16. The heel region 17 generally underlies the calcaneus bone. The first cushioning layer 22, the second cushioning layer 24, and the third cushioning layer 26 are stacked with the second cushioning layer 24 partially overlying the first cushioning layer 22, and the third cushioning layer 26 overlying the second cushioning layer 24 when the article of footwear 10 is worn on a foot 16 so that the sole structure 12 is disposed with the third cushioning layer 26 nearest the foot 16 and the first cushioning layer 22 nearest the ground surface G, such as when the outsole 20 is in contact with the ground surface G. The first cushioning layer 22 includes a ground-facing outer surface 28 of the midsole system 18, and the third cushioning layer 26 includes a foot-facing outer surface 30 of the midsole system 18. The ground-facing outer surface 28 is a domed lower surface of the cushioning unit 19. As is apparent in FIG. 2, the first cushioning layer 22 underlies the second cushioning layer 24, and the domed lower surface 28 extends away from the second cushioning layer 24. The second cushioning layer 24 is annular and borders a central portion of the first cushioning layer 22 (i.e., the portion between the phantom lines 56 of FIG. 4, as discussed herein.

The midsole system 18 includes a first polymeric sheet 32, a second polymeric sheet 34, and a third polymeric sheet 36. The first cushioning layer 22 is formed by the first and second polymeric sheets 32, 34, which form and define a first sealed chamber 38 bounded by the first polymeric sheet 32 and the second polymeric sheet 34. The second cushioning layer 24 is formed by the second polymeric sheet 34 and the third polymeric sheet 36, which form and define a second sealed chamber 40 bounded by the second polymeric sheet 34 and the third polymeric sheet 36.

The first, second, and third polymeric sheets 32, 34, 36 are a material that is impervious to gas, such as air, nitrogen, or another gas. This enables the first sealed chamber 38 to retain a gas at a first predetermined pressure, and the second sealed chamber 40 to retain a gas at a second predetermined pressure. A third cushioning layer 26 of the midsole system 18 is removed in FIG. 2. FIG. 4 shows the same portion of the sole structure 12 as FIG. 2, but with the third cushioning layer 26 included. Having the first sealed chamber 38 of the cushioning unit 19 shown not in fluid communication with the first sealed chamber 38 of any of the other cushioning units 19 or with the second sealed chamber 40 or chambers of the same or other cushioning units 19 allows separate, discrete, first sealed chambers 38 to be optimized in geometry and pressure for various areas of the foot. For example, the cushioning units 19 can be customized in number, size, location, and fluid pressure for a foot map of pressure loads of a specific wearer, or for a population average of wearers of the particular size of footwear. Separate cushioning units 19 also enhance flexibility of the midsole system 18 as areas between the cushioning units 19 are of reduced thickness, as is apparent in the side view of FIG. 1, and thus reduce bending stiffness of the midsole system 18. For example, areas of webbing (also referred to herein as bonds), best shown in FIG. 9, where the first and second polymeric sheets 32, 34 are bonded to one another between the domed first chambers 38 of adjacent cushioning units 19, are of reduced thickness. The areas between cushioning units 19 function as flex grooves and can be disposed at desired flex regions of the midsole system 18. In FIG. 9, channels 43 are shown that connect the second chambers 40 of each cushioning units 19 for fluid communication with one another.

The polymeric sheets 32, 34, 36 can be formed from a variety of materials including various polymers that can resiliently retain a fluid such as air or another gas. Examples of polymer materials for polymeric sheets 32, 34, 36 include thermoplastic urethane, polyurethane, polyester, polyester polyurethane, and polyether polyurethane. Moreover, the polymeric sheets 32, 34, 36 can each be formed of layers of different materials. In one embodiment, each polymeric sheet 32, 34, 36 is formed from thin films having one or more thermoplastic polyurethane layers with one or more barrier layers of a copolymer of ethylene and vinyl alcohol (EVOH) that is impermeable to the pressurized fluid contained therein as disclosed in U.S. Pat. No. 6,082,025, which is incorporated by reference in its entirety. Each polymeric sheet 32, 34, 36 may also be formed from a material that includes alternating layers of thermoplastic polyurethane and ethylene-vinyl alcohol copolymer, as disclosed in U.S. Pat. Nos. 5,713,141 and 5,952,065 to Mitchell et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. The polymeric sheets 32, 34, 36 may also each be a flexible microlayer membrane that includes alternating layers of a gas barrier material and an elastomeric material, as disclosed in U.S. Pat. Nos. 6,082,025 and 6,127,026 to Bonk et al. which are incorporated by reference in their entireties. Additional suitable materials for the polymeric sheets 32, 34, 36 are disclosed in U.S. Pat. Nos. 4,183,156 and 4,219,945 to Rudy which are incorporated by reference in their entireties. Further suitable materials for the polymeric sheets 32, 34, 36 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the polymeric sheets 32, 34, 36, engineering properties such as tensile strength, stretch properties, fatigue characteristics, dynamic modulus, and loss tangent can be considered. The thicknesses of polymeric sheets 32, 34, 36 can be selected to provide these characteristics.

The first and second sealed chambers 38, 40 are not in fluid communication with one another. Stated differently, the first and second sealed chambers 38, 40 are sealed from one another by the second polymeric sheet 34. This allows the first and second sealed chambers 38, 40 to retain gas at different pressures. The first sealed chamber 38 retains gas at a first predetermined pressure when the midsole system 18 in an unloaded state, and the second sealed chamber 40 retains gas at a second predetermined pressure in the unloaded state. The unloaded state is the state of the midsole system 18 when it is not under either steady state or dynamic loading. For example, the unloaded state is the state of the midsole system 18 when it is not bearing any loads, such as when it is not on the foot 16. The second predetermined pressure can be different than the first predetermined pressure. In the embodiment shown, the second predetermined pressure is higher than the first predetermined pressure. In one non-limiting example, the first predetermined pressure is 7 pounds per square inch (psi), and the second predetermined pressure is 20 psi. The predetermined pressures may be inflation pressures of the gas to which the respective sealed chambers 38, 40 are inflated just prior to finally sealing the chambers 38, 40. The lowest one of the predetermined pressures, such as the first predetermined pressure, may be ambient pressure rather than an inflated pressure. The different cushioning units 19 can have different pressures in their respective first sealed chambers 38, as the first sealed chambers 38 are not in fluid communication with one another. For example, pressures of the first sealed chambers 38 of cushioning units 19 in the heel region 17 can be lower than pressures in the midfoot region 15 and/or the forefoot region 13.

In the embodiment shown, the third cushioning layer 26 is foam. By way of non-limiting example, the foam of the third cushioning layer 26 may be at least partially a polyurethane foam, a polyurethane ethylene-vinyl acetate (EVA) foam, and may include heat-expanded and molded EVA foam pellets.

The first cushioning layer 22 has a first stiffness K1 that is determined by the properties of the first and second polymeric sheets 32, 34, such as their thicknesses and material, and by the first predetermined pressure in the first sealed chamber 38. The second cushioning layer 24 has a second stiffness K2 that is determined by the properties of the second and third polymeric sheets 34, 36, such as their thicknesses and material, and by the second predetermined pressure in the second sealed chamber 40. The third cushioning layer 26 has a third stiffness K3 that is dependent on the properties of the foam material, such as the foam density. The stiffness K1, K2, and/or K3 need not be linear throughout a stage of compression. For example, the stiffness K3 of the third cushioning layer may increase exponentially with displacement.

Figure 5:
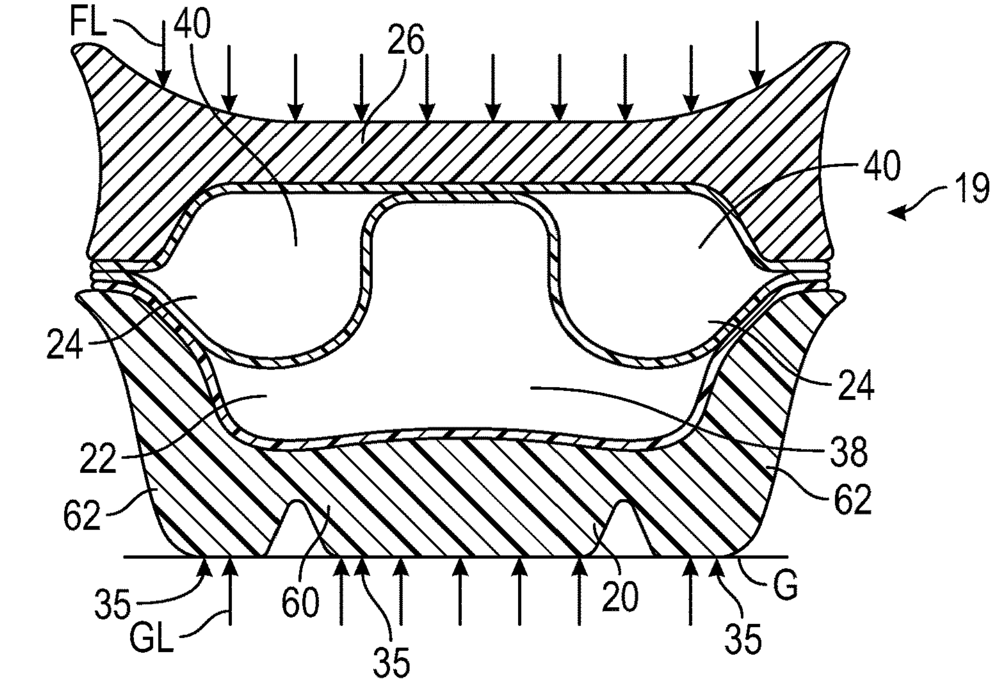
FIG. 5 is a schematic illustration in cross-sectional view of the portion of the sole structure of FIG. 4 in a first stage of compression.
Figure 6:
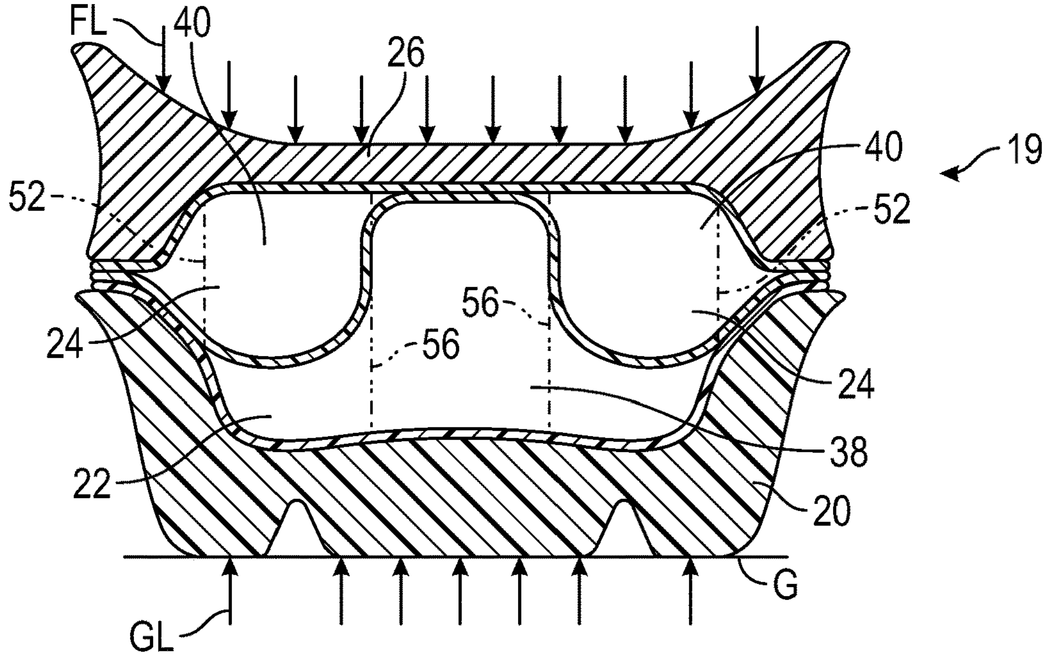
FIG. 6 is a schematic illustration in cross-sectional view of the portion of the sole structure of FIGS. 4-5 in a second stage of compression.
Figure 7:
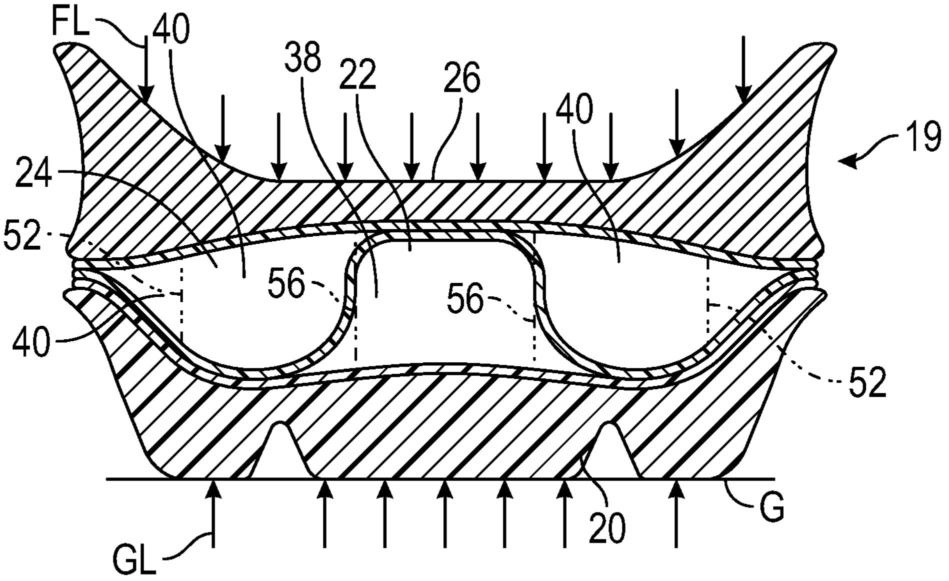
FIG. 7 is a schematic illustration in cross-sectional view of the portion of the sole structure of FIGS. 4-6 in a third stage of compression.

A dynamic compressive load on the sole structure 12 is due to an impact of the article of footwear 10 with the ground, as indicated by a footbed load FL of a person wearing the article of footwear 10 and an opposite ground load GL. The footbed load FL is shown in FIGS. 5-7 as a series of arrows acting on the foot-facing outer surface 30, and the ground load GL is shown as a series of arrows acting on a ground contact surface 35 of the outsole 20. The footbed load FL is represented by all of the downward arrows on the foot-facing outer surface 30. The ground load GL is represented by all of the upward arrows on the ground contact surface 35. The dynamic compressive load is absorbed by the first cushioning layer 22, the second cushioning layer 24, and the third cushioning layer 26 of a particular cushioning unit 19 in a sequence according to increasing magnitudes of the first stiffness K1, the second stiffness K2, and the third stiffness K3 from least stiff to most stiff. In the embodiment shown, the stiffness of the cushioning layers 22, 24, 26 increase in the following order: first stiffness K1, third stiffness K3, and second stiffness K2, and the dynamic compressive load is thus absorbed by the cushioning layers in the following order: first cushioning layer, 22, third cushioning layer 26, and second cushioning layer 24 but any combination of relative pressures is possible.

The second polymeric sheet 34 and the third polymeric sheet 36 are bonded to one another between the first sealed chamber 38 and the third cushioning layer 26 at a bond 42 (also referred to herein as webbing) having an outer periphery 44 with a closed shape. In the embodiment shown, the closed shape is substantially circular, as best shown in the bottom view of FIG. 9, where the bond 42 is visible through the first polymeric sheet 32. The polymeric sheets are indicated as substantially transparent. Alternatively, any or all of the polymeric sheets could instead be opaque. The second sealed chamber 40 borders the outer periphery 44 of the bond 42. All three of the first polymeric sheet 32, the second polymeric sheet 34, and the third polymeric sheet 36 are bonded to one another at a peripheral flange 46 at an outer periphery of the midsole system 18 as shown in FIG. 4. The bond 42 is disposed substantially level with an uppermost extent 49 of the second sealed chamber 40 when the sole structure 12 is unloaded, as indicated in FIGS. 2 and 4. At the time of bonding the second and third polymeric sheets 34, 36 at the bond 42, all of the polymeric sheets 32, 34, 36, are in the initial, flat stacked state. The bond 42 can be positioned at the uppermost extent 49 of the second sealed chamber 40 by inflating the second sealed chamber 40 prior to inflation of the first sealed chamber 38, and at a higher inflation pressure than the first sealed chamber 38. When inflation occurs in this order with these relative inflation pressures, the bond 42 will roll upward from a position substantially level with the flange 46 to the position shown in FIGS. 2 and 4 as the first sealed chamber 38 is inflated and sealed. The third cushioning layer 26 is thereafter bonded to the upper surface 54 of the third polymeric sheet 36.

With the bond 42 disposed substantially level with an uppermost extent 49 of the second sealed chamber 40, a relatively flat upper surface 54 is presented to the third cushioning layer 26 at the uppermost extent 49 of the second cushioning layer 24. This helps to enable a relatively flat foot-facing outer surface 30 of the midsole system 18 if such is desired. For example, the cushioning unit 19 illustrated in FIGS. 2 and 4 extends generally the width of the footbed at a heel portion 17 of the sole structure 12, as is evident in FIG. 9. Because the bond 42 is higher than the flange 46, there is no depression or central cavity between the uppermost extent 49 and a top surface of the bond 42. In other embodiments, the bond 42 need not be level with the uppermost extent 49, in which case a cavity between the bond and the uppermost extent 49 can be left as a void at ambient pressure under the third cushioning layer 26, or can be filled by the third cushioning layer 26.

Although the bond 42 is shown as substantially circular, in other embodiments, the closed shape may be substantially oval, or may be an equilateral polygon, such as a substantially triangular bond or a substantially rectangular. It should be appreciated that each of the closed shapes may have rounded corners. Equilateral closed shapes are relatively easy to dispose closely adjacent to one another in various orientations to cover select portions of a midsole. Each bond is surrounded at an outer periphery by an annular second cushioning layer having substantially the same shape as the bond which it surrounds. A bond that has any of these closed shapes also enables the first polymeric sheet 32 to have a ground-facing outer surface 28 that is a domed lower surface such as shown in FIG. 4. The unrestrained portion of the first sealed chamber 38 tends to adopt the domed shape due to the force of the internal gas pressure on the inner surfaces of the polymeric sheets 32, 34 bounding the first sealed chamber 38.

Selection of the shape, size, and location of various bond portions of a midsole, such as the midsole system 18, enables a desired contoured outer surface of the finished midsole system. Prior to bonding at the bond 42, at the flange 46, and at the bond 47 discussed below, the polymeric sheets 32, 34, 36 are stacked, flat sheets. Anti-weld material may be ink-jet printed at all selected locations on the sheets where bonds are not desired. For example, the anti-weld material may be printed on both sides of the second polymeric sheet 34 and/or on the upper surface of the first polymeric sheet 32, and the upper surface of the second polymeric sheet 34. The stacked, flat polymeric sheets are then heat pressed to create bonds between adjacent sheets on all adjacent sheet surfaces except for where anti-weld material was applied. No radio frequency welding is necessary.

Once bonded, the polymeric sheets 32, 34, 36 remain flat, and take on the contoured shape only when the chambers 38, 40 are inflated and then sealed. The polymeric sheets 32, 34, 36 are not thermoformed. Accordingly, if the inflation gas is removed, and assuming other components are not disposed in any of the sealed chambers, and the polymeric sheets are not yet bonded to other components such as the outsole 20 or the cushioning layer 26, the polymeric sheets 32, 34, 36 will return to their initial, flat state. The outsole 20 is bonded to the ground-facing outer surface 28 by adhesive or otherwise only after inflation and sealing of the first sealed chamber 38.

Figure 8:
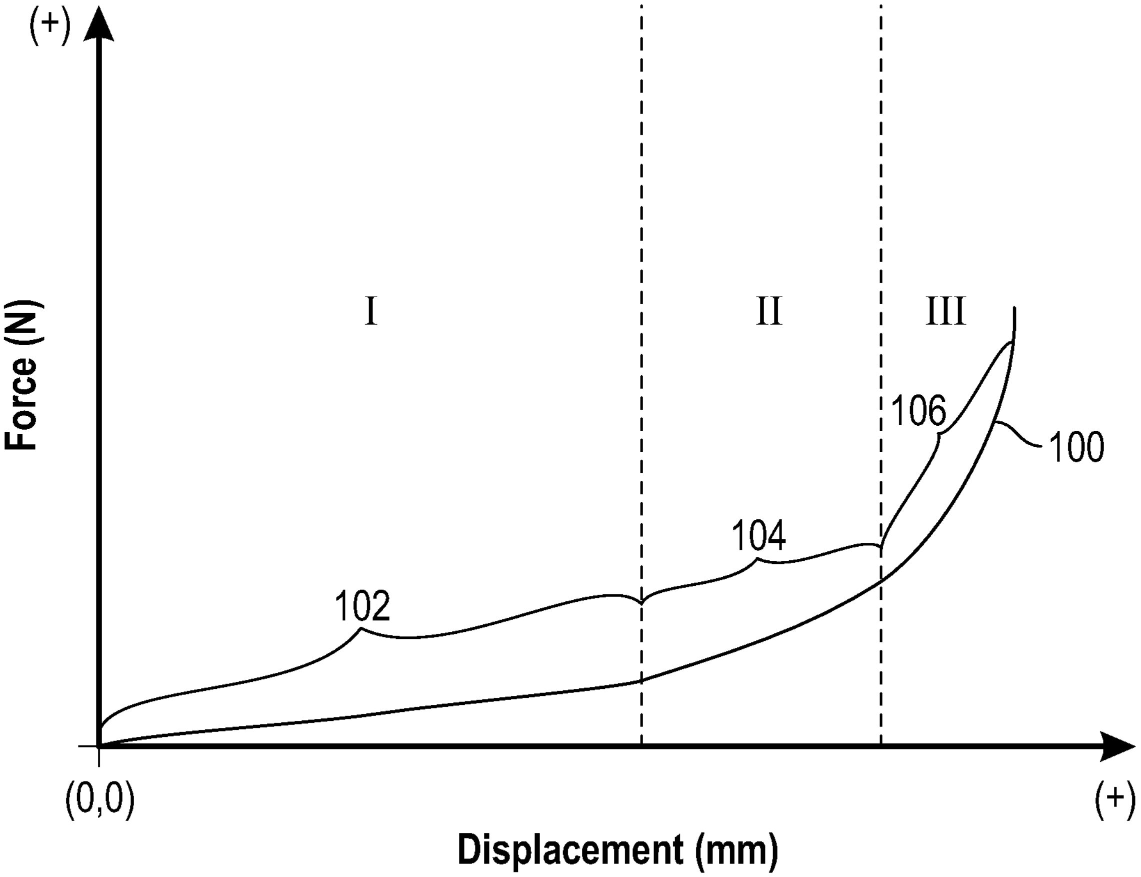
FIG. 8 is a plot of force versus displacement during dynamic compressive loading of the portion of the sole structure of FIG. 2.

In the embodiment shown in FIG. 2, the second sealed chamber 40 is an annulus (i.e., is substantially annular) that has the equilateral shape of the bond 42 that it borders. In the embodiment of FIG. 2, the second chamber 40 is a ring-shaped annulus (i.e., generally toroidal). A bond that has one of the closed shapes discussed herein enables the ground-facing outer surface 28 of the underlying first polymeric sheet 32 to adopt a domed shape that is substantially centered under the bond, as shown by the domed ground-facing outer surface 28 (also referred to as a domed lower surface 28 or domed portion 28) centered under bond 42 and extending away from the second and third cushioning layers 24, 26. The domed lower surface 28 is thus also centered under and stabilized by the higher pressure second sealed chamber 40 of the second cushioning layer 24, which borders and surrounds the outer periphery 44 of the bond 42. A domed ground-facing outer surface provides a relatively large amount of vertical displacement of the first cushioning layer 22 under dynamic compression in comparison to a flat lower surface, prolonging the stage of load absorption by the first cushioning layer 22. The first stage of compression is represented by portion 102 of the load versus displacement curve 100 of FIG. 8 that represents the absorption of the dynamic compressive load by the first cushioning layer 22 with the first stiffness K1, which, in the embodiment of FIGS. 2 and 4-7 is the least stiff cushioning layer.

With reference to FIG. 4, a central portion of the first sealed chamber 38 directly underlies the third cushioning layer 26 as a bond 42 and a peripheral portion of the first sealed chamber 38 directly underlies a portion of the second sealed chamber 40. The central portion is between lines 56 and the peripheral portion is outward of lines 56. The first polymeric sheet 32 and the second polymeric sheet 34 are bonded to one another at a bond 47 along an outer peripheral portion 48 of an underside 50 of the second sealed chamber 40. Accordingly, the first sealed chamber 38 underlies the second sealed chamber 40 only inward of the outer peripheral portion 48 (i.e., only inward of the phantom lines 52). The portion of the second sealed chamber 40 overlying the first sealed chamber 38 is the annular portion between the phantom lines 52 and 56. The bond 47 reduces the height of the first sealed chamber 38 under the bond 42 to height H1, which is lower in comparison to a height that would exist if the first and second polymeric sheets 32, 34 were bonded to one another only at the flange 46. A reduced height of the first sealed chamber 38 may enhance the stability of the first cushioning layer 22 in that it may minimize tilting or tipping of the domed ground-facing outer surface 28 during compression. By varying the size of the bond 47, the height H1 and thus the amount of displacement available in compression of the first cushioning layer 22 can be tuned, affecting the domain of the low rate portion 102 of the load versus displacement curve 100 (i.e., the displacement over which the low rate portion 102 extends).

As discussed, the second sealed chamber 40 directly overlies only the peripheral portion of the first sealed chamber 38. The peripheral portion is the ring-shaped portion between the phantom lines 52 and 56. The third cushioning component 26 directly overlies only a remaining central portion of the first sealed chamber 38, i.e., that portion between (inward of) the phantom lines 56. With this relative disposition of the cushioning layers 22, 24, 26, the first cushioning layer 22 absorbs the dynamic compressive load in series with the second cushioning layer 24 and the third cushioning layer 26 at the peripheral portion of the first sealed chamber 38 (the portion between phantom lines 52 and 56), and the first cushioning layer 22 absorbs the dynamic compressive load in parallel with the second cushioning layer 24 and in series with the third cushioning layer 26 at the central portion of the first sealed chamber 38 (the portion between the phantom lines 56). As used herein, a cushioning layer directly overlies another cushioning layer when it is not separated from the cushioning layer by a cushioning portion of an intervening cushioning layer (i.e., a foam portion or a gas-filled sealed chamber). A bond that separates cushioning layers, such as bond 42, is not considered a cushioning portion of a cushioning layer. Accordingly, cushioning layers are considered to directly overlie one another when separated only by a bond. The first sealed chamber 38 directly underlies the bond 42 and the third cushioning layer 26 directly overlies the bond 42. The third cushioning layer 26 directly overlies the remaining portion of the first sealed chamber 38 as it is separated from the remaining portion of the first sealed chamber 38 only by bond 42 and not by the second sealed chamber 40.

As described, the second cushioning layer 24 is disposed at least partially in series with the first cushioning layer 22 relative to a dynamic compressive load FL, GL applied on the midsole system 18. More specifically, the first cushioning layer 22 and the second cushioning layer 24 are in series relative to the load FL, GL between the phantom lines 52 and 56. The third cushioning layer 26 is disposed at least partially in series with the first cushioning layer 22 and at least partially in series with the second cushioning layer 24 relative to the dynamic compressive load FL, GL. More specifically, the third cushioning layer 26 is directly in series with the first cushioning layer 22 inward of the phantom lines 56. The first cushioning layer 22, the second cushioning layer 24, and the third cushioning layer 26 are in series relative to the dynamic compressive load FL, GL between the phantom lines 52 and 56. The third cushioning layer 26 is in series with the first cushioning layer 22 but not the second cushioning layer 24 between the phantom lines 56. The third cushioning layer 26 is in series with the second cushioning layer 24 but not the first cushioning layer 22 outward of the phantom lines 52.

Figure 3:
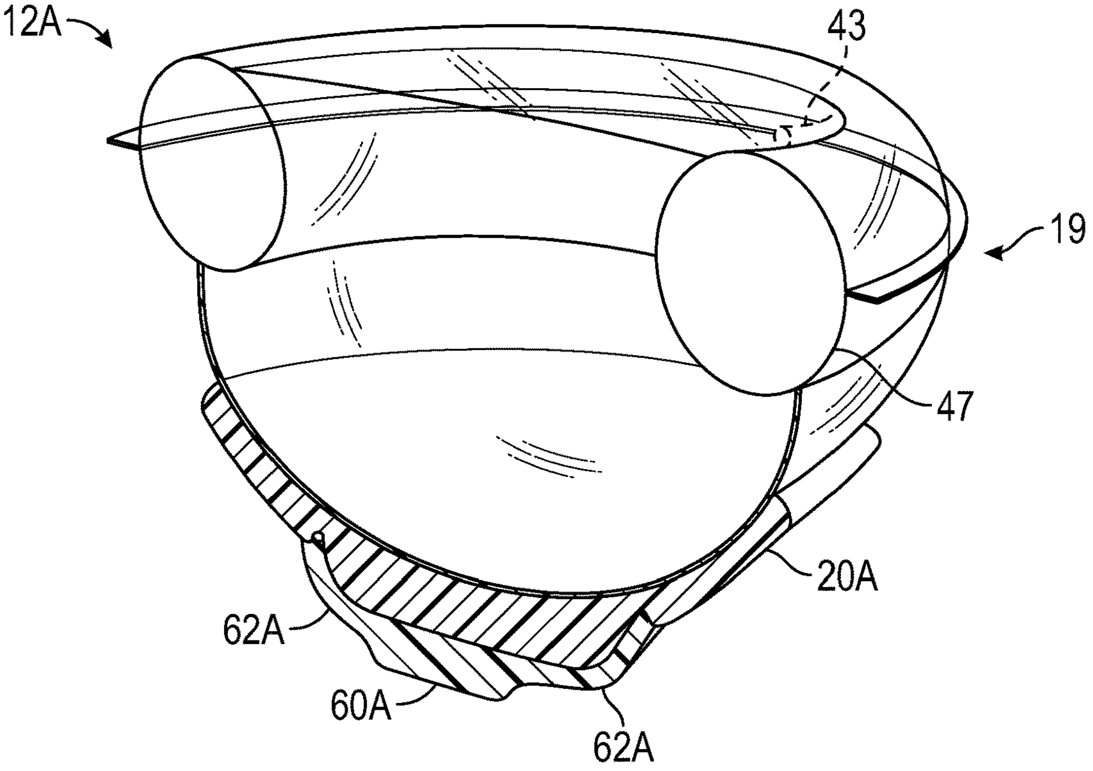
FIG. 3 is a schematic illustration in cross-sectional perspective view of a portion of an alternative cushioning unit for the article of footwear of FIG. 1.

The outsole 20 is secured to the domed lower surface 28 of the first polymeric sheet 32. The outsole 20 includes a central lug 60 substantially centered under the domed lower surface 28 of the first polymeric sheet 32 and serving as ground contact surface 35. The outsole 20 also includes one or more side lugs 62 disposed adjacent the central lug 60, i.e., surrounding the central lug 60 and further up the sides of the domed ground-facing outer surface 28. The side lugs 62 are shorter than the central lug 60, and are configured such that they are not in contact with (i.e., are displaced from) the ground surface G when the sole structure 12 is unloaded, or is under only a steady state load or a dynamic compressive load not sufficiently large to cause compression of the first sealed chamber 38 to the state of FIG. 5. The lugs 60, 62 may be an integral portion of the outsole 20 as shown in FIGS. 2 and 4. In an alternative embodiment of a sole structure 12A shown in FIG. 3, an outsole 20A has a central lug 60A and side lugs 62A not integrally formed with but secured to the outsole 20A so that the outsole 20A with the lugs 60A, 62A functions as a unitary component and in a manner substantially the same as outsole 20 and lugs 60, 62.

The width W1 of the central lug 60 at the ground contact surface G is less than a width W2 of the domed lower surface 28 of the first polymeric sheet 32. Because the central lug 60 rests on the ground surface G, the reaction load (ground load GL) of the dynamic compressive load on the midsole system 18 is initially applied through the central lug 60 toward a center of the domed lower surface 28 of the first polymeric sheet 32 where the maximum available displacement of the first sealed chamber 38 exists (i.e., at the greatest height H1 of the first sealed chamber 38). Because the central lug 60 is not as wide as the first sealed chamber 38, the first sealed chamber 38 may compress around the central lug 60.

The material of the outsole 20 in the embodiment shown has a fourth stiffness K4 (i.e., compressive stiffness) that is greater than the first stiffness K1 of the first cushioning layer 22, and may be more or less stiff than either or both of the second stiffness K2 of the second cushioning layer 24 and the third stiffness K3 of the third cushioning layer 26. For example, the outsole 20 could be polymeric foam, such as injected foam. In the embodiment shown, the fourth stiffness K4 is greater than the first stiffness K1, the second stiffness K2, and the third stiffness K3.

With reference to FIGS. 5-8, the stages of absorption of the dynamic compressive load FL, GL, represented by the footbed load FL and the ground load GL, are schematically depicted assuming that the first stiffness K1 of the first cushioning layer 22 is less than the second stiffness K2 of the second cushioning layer 24, and the third stiffness K3 of the third cushioning layer 26 is greater than the first stiffness K1 and less than the second stiffness K2. When the sole structure 12 initially receives the dynamic compressive load FL, GL, a first stage of compression I occurs, in which the least stiff first cushioning layer 22 is the first to compress, and compresses around the lug 60, changing the shape of the first sealed chamber 38 and compressing the gas in the first sealed chamber 38 such that the overall volume of the first sealed chamber 38 reduces relative to the state shown in FIGS. 2 and 4. The first stage of compression I is represented in FIG. 5. Compression of the second sealed chamber 40, the third cushioning layer 26, and the outsole 20 in the first stage of compression I, either does not occur or is only minimal. In the first stage of compression I shown in FIG. 5, the compression of the first sealed chamber 38 moves the side lugs 62 level with the central lug 60, causing the side lugs 62 to now form part of the ground contact surface 35 over which the ground load GL is spread, such that the ground contact surface 35 is larger in area compared to the steady-state loading of FIGS. 2 and 4. The midsole system 18 has an effectively linear stiffness during the first stage of compression I, as represented by the portion 102 of the stiffness curve 100, with a numerical value substantially equal to the first stiffness K1.

In the second stage of compression II, shown in FIG. 6, the third cushioning layer 26 begins compressing, as indicated by the decreased thickness of the third cushioning layer 26 in comparison to FIG. 5. Compression of the first sealed chamber 38 of the first cushioning layer 22 may continue in series with compression of the third cushioning layer 26 in the second stage of compression II, assuming that the first cushioning layer 22 has not reached its maximum compression under the dynamic compressive load. The midsole system 18 has an effective stiffness during the second stage of compression II that is a dependent upon the third stiffness K3, and may be partially dependent on the first stiffness K1. The effective stiffness of the midsole system 18 during the second stage of compression II is represented by the portion 104 of the stiffness curve 100 in FIG. 8.

In the third stage of compression III, shown in FIG. 7, the second cushioning layer 24 begins compressing by compression of the gas in the second sealed chamber 40. If compression of the first sealed chamber 38 has not yet reached its maximum compression under the dynamic compressive load, then compression of the first sealed chamber 38 will continue in series with the second cushioning layer 24, such as in the volume between phantom lines 52 and 56, and in parallel with the second cushioning layer 24 in the volume between lines 56. If compression of the third cushioning layer 26 has not already reached its maximum under the dynamic compressive load in the second stage II, then compression of the third cushioning layer 26 will continue during the third stage III in series with compression of the second cushioning layer 24 and in series with compression of the first cushioning layer 22, assuming compression of the first cushioning layer 22 has not already reached its maximum under the dynamic compressive load. The stiffness K4 of the outsole 20 can be selected such that compression of the outsole 20 will not begin until after the third stage of compression III.

The midsole system 18 has an effective stiffness in the third stage of compression III that corresponds mainly with the relatively stiff second cushioning layer 24. Sealed chambers of compressible gas tend to quickly ramp in compression in a non-linear manner after an initial compression. The effective stiffness of the midsole system 18 during the third stage of compression III is dependent upon the second stiffness K2, potentially to a lesser extent in part on the first stiffness K1 (if the first sealed chamber 38 continues compressing in series and/or parallel with the second sealed chamber 40), and potentially to a lesser extent in part on the third stiffness K3 (if the foam of the cushioning layer 26 continues compressing in series and/or parallel with the second sealed chamber 40). The effective stiffness of the midsole system 18 during the third stage of compression III is represented by the portion 106 of the stiffness curve 100 in FIG. 8. Because the third stage of compression III occurs after the first and second stages, it may coincide with movement of the article of footwear 10 to a dorsiflexed position in which an athlete is nearing a final toe-off position (i.e., when completing a forward step or stride just prior to the article of footwear being lifted out of contact with the ground). Greater compressive stiffness may be desirable at toe off to provide the athlete with a sensation of connection to the ground, in comparison to at the initial impact when energy absorption and isolation from the ground is most desirable.

Additionally, because in the embodiment shown, the second sealed chambers 40 of each of the cushioning units 19A-19H are in fluid communication with one another, compression of the second sealed chamber 40 of the rearmost cushioning unit 19A in the heel region 17 can displace gas forward to the second sealed chamber 40 of the adjacent cushioning unit 19B, then to cushioning unit 19C, and so on forward to cushioning unit 19H. The advancement of the displaced gas is encouraged by the natural rolling of the foot 16 forward from heel to toe. Accordingly, by the time of toe-off, the pressures in the second sealed chambers 40 of the forward-most cushioning units, such as 19G, 19E, and 19H, are greater than the initial pressure of the second sealed chamber 40 of the rearmost cushioning unit 19A, supporting the foot during toe-off, and effectively returning energy from the heel strike at the forefoot.

As best shown in FIGS. 1 and 4, the third cushioning layer 26 overlays all of the various cushioning units. The cushioning layer 26 acts as a carrier that effectively holds the cushioning units relative to one another. More specifically, the cushioning layer 26 has a lower surface 25 that has a plurality of recesses 27 shaped such that the cushioning units 19A-19H are nested in the third cushioning layer 26, each at a respective recess 27. The cushioning units 19A-19H are only partially nested in the cushioning layer 26, with the portion above the flange 46 in the respective recess 27. The cushioning units 19A-19H can be secured to the cushioning layer 26 in the recesses 27 such as with adhesive or by thermal bonding. The third cushioning layer 26 may also have small channel recesses interconnecting the recesses 27 and receiving the channels 43 of FIG. 9, or the channels 43 may be un-nested, just below the lower surface 25 of the third cushioning layer 26.

Figure 10:
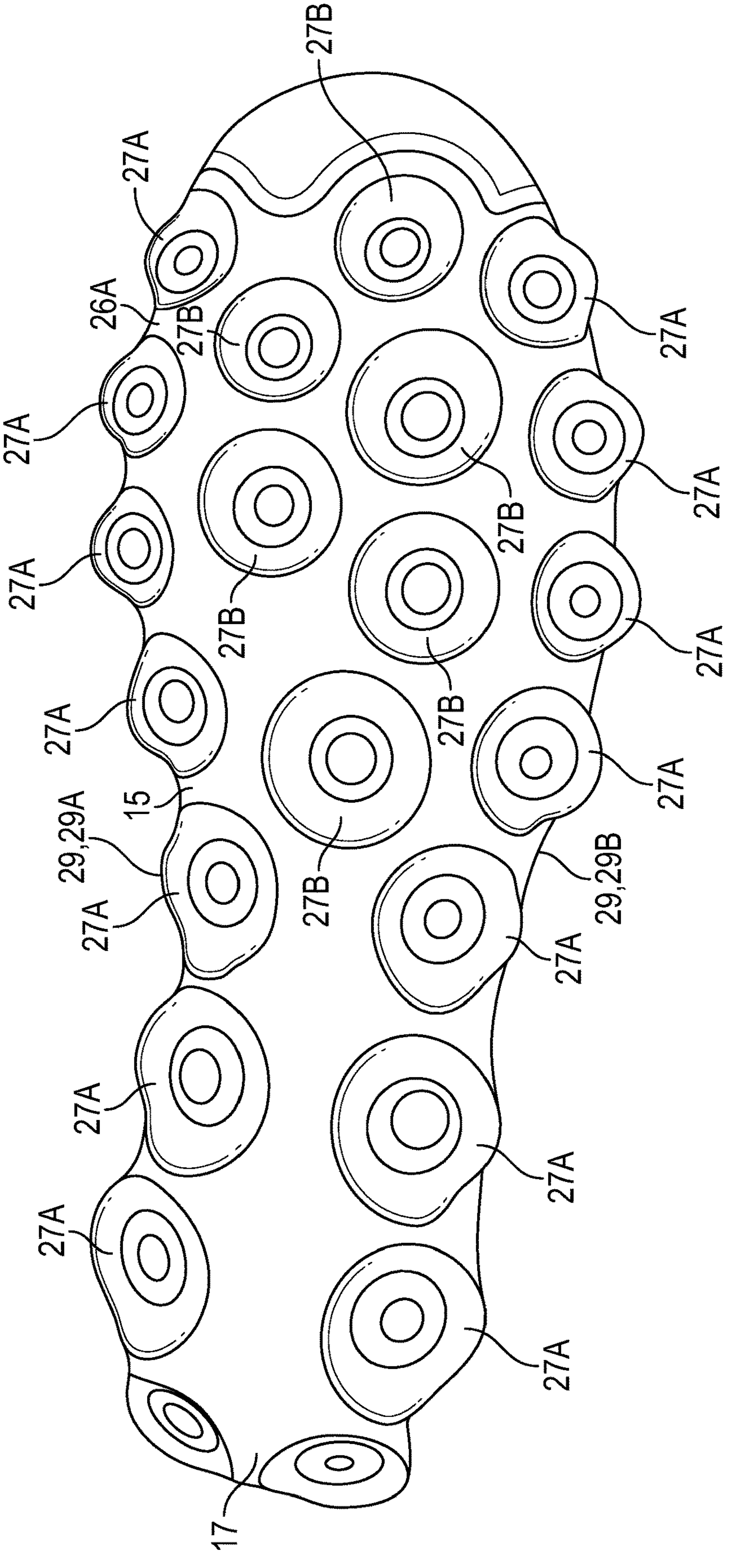
FIG. 10 is a schematic illustration in bottom view of an embodiment of a third cushioning layer for a midsole system.

FIG. 10 shows another embodiment of a third cushioning layer 26A for use with a midsole system 18 including multiple cushioning units 19. The third cushioning layer 26A includes a plurality of recesses 27A, 27B at a lower surface 25 for receiving and partially nesting the cushioning units 19. The recess 27A are peripheral recesses, located adjacent a periphery 29 of the third cushioning layer 26A, which is also the periphery of the sole structure 12. The periphery 29 has a medial periphery 29A, and a lateral periphery 29B. The recesses 27B are central recesses, disposed inward relative to the peripheral recesses 27A so that the peripheral recesses 27A are between the periphery 29 and the central recesses 27B. In an embodiment, cushioning units 19 disposed in the peripheral recesses 27A are each fluidly isolated from each other one of the cushioning units 19. In contrast the cushioning units 19 disposed in the central recesses 27B may be in fluid communication with one another via channels 43, and are referred to as interconnected cushioning units. Such an arrangement enables each peripheral cushioning unit (i.e., the isolated cushioning units 19 disposed at the peripheral recesses 27A) to maintain a stiffness response independent of the progression of foot loading. For example, each peripheral cushioning unit may be configured and pressurized to provide a relatively stiff response, providing stability to discourage overpronation and/or underpronation (supination). The interconnected, central cushioning units 19 disposed at the central recesses 27B would allow gas to be displaced amongst the second sealed chambers 40 of the respective central cushioning units, which may provide energy return by utilizing the pressure at more rearward units, which may be subjected to loading prior to the more forward central units, to add stiffness to the more forward units via the added pressure of the transferred gas.

Figure 11:
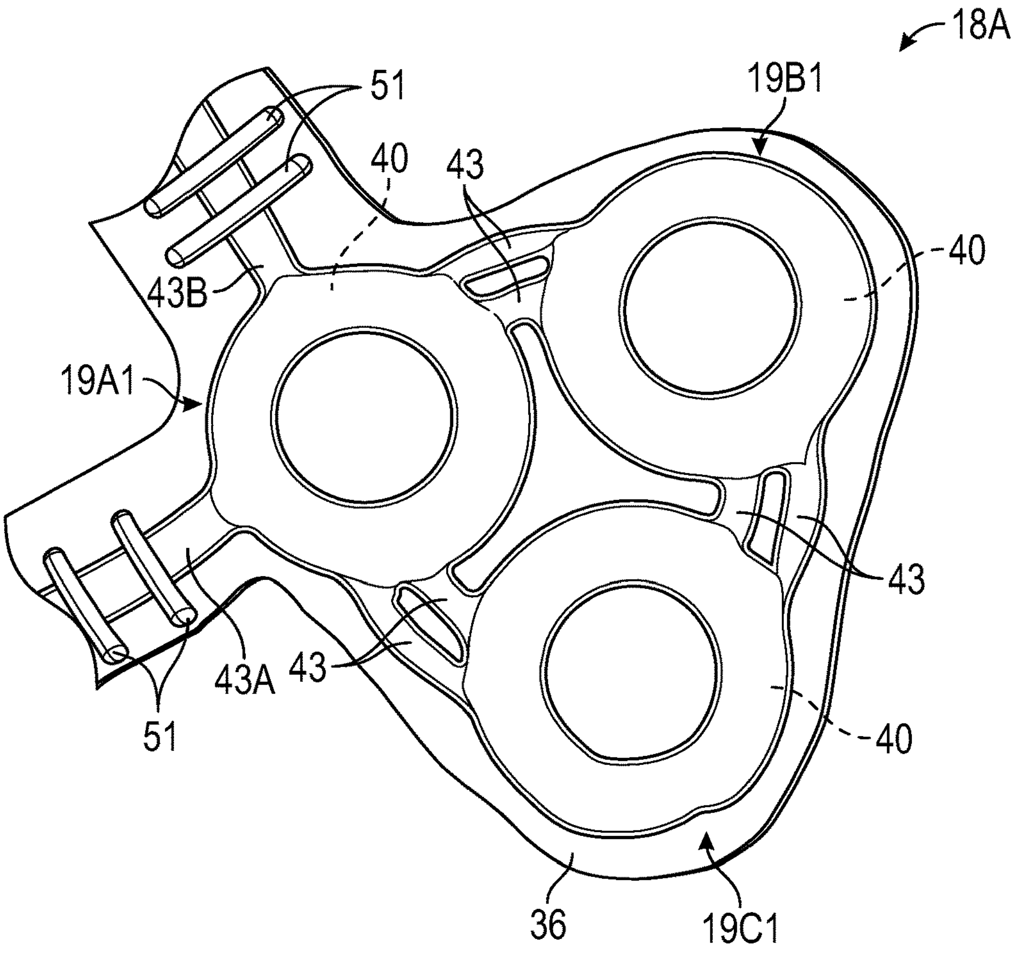
FIG. 11 is a schematic plan view illustration of an embodiment of a midsole system with a group of fluidly-interconnected cushioning units.
Figure 12:
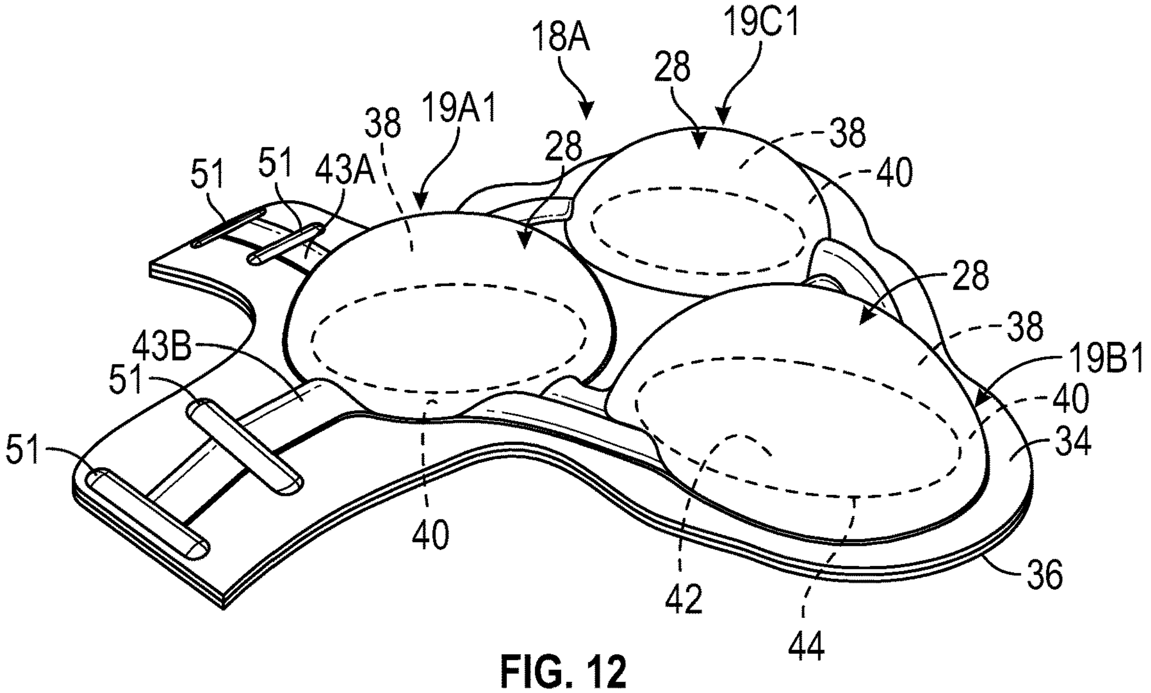
FIG. 12 is a schematic perspective illustration of the midsole system of FIG. 11 in an inverted position.
Figure 13:
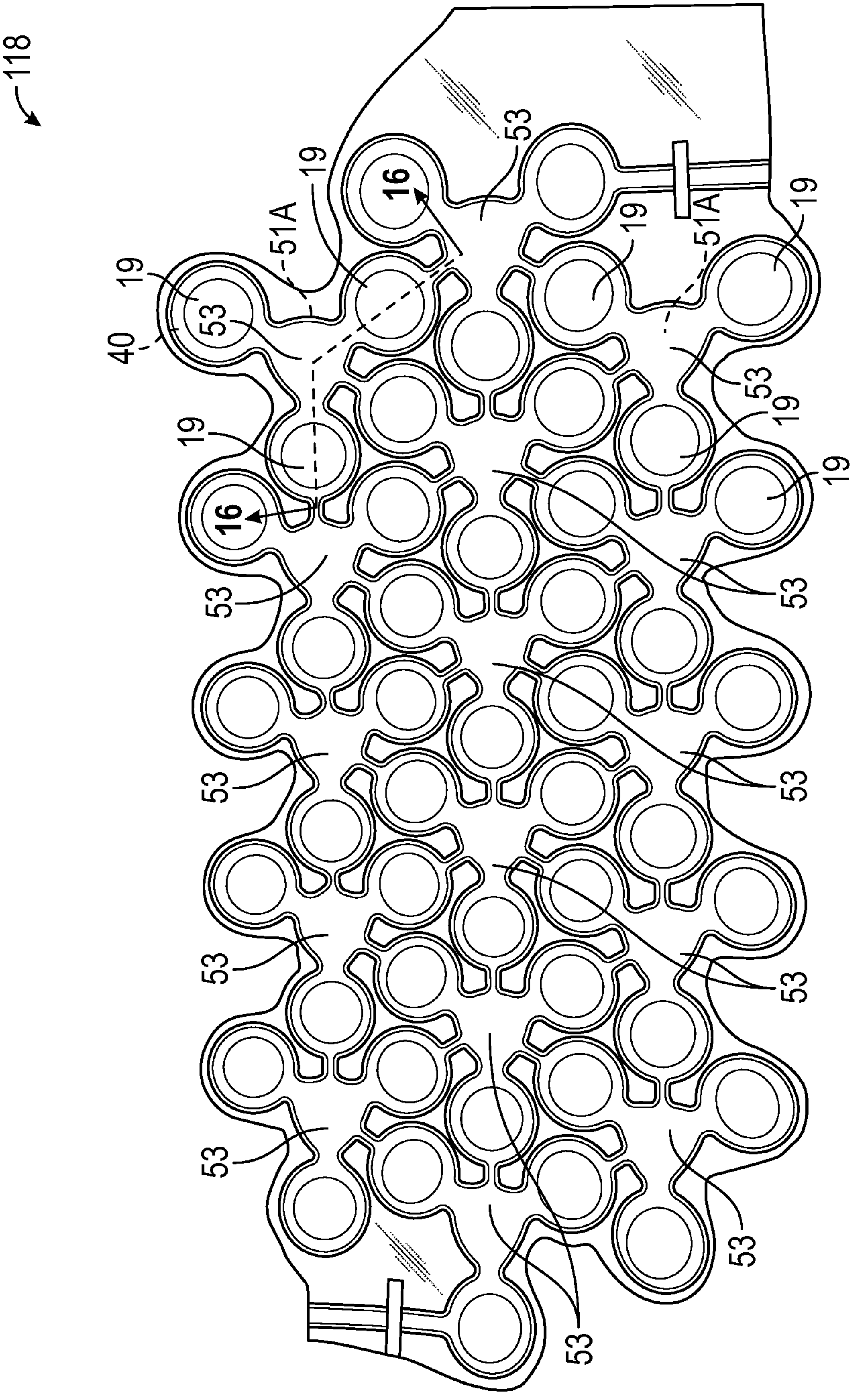
FIG. 13 is a schematic plan view illustration of an embodiment of a midsole system with a group of fluidly-interconnected cushioning units and linking chambers.
Figure 14:
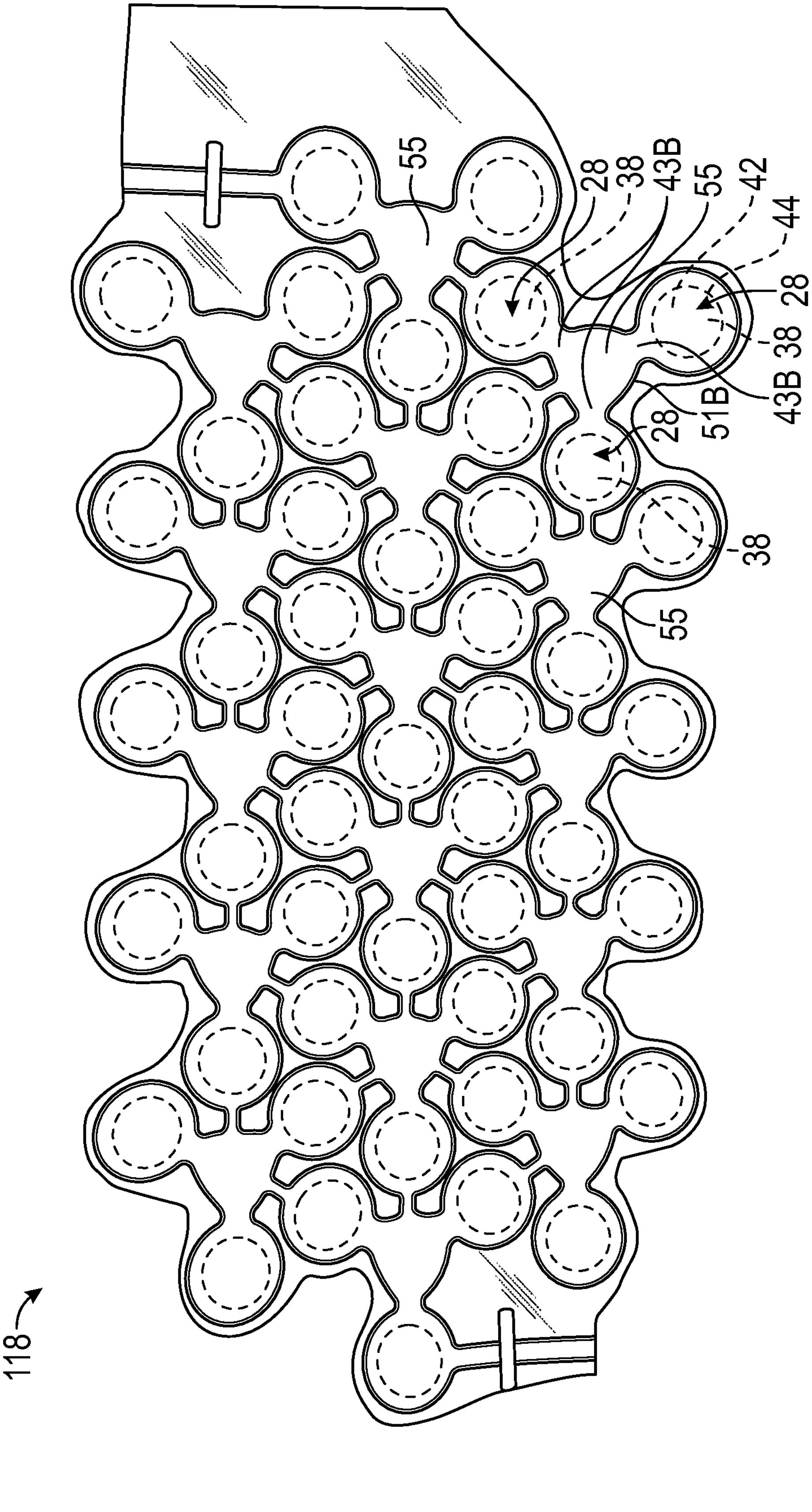
FIG. 14 is a schematic illustration of the midsole system of FIG. 13 in bottom view.
Figure 15:
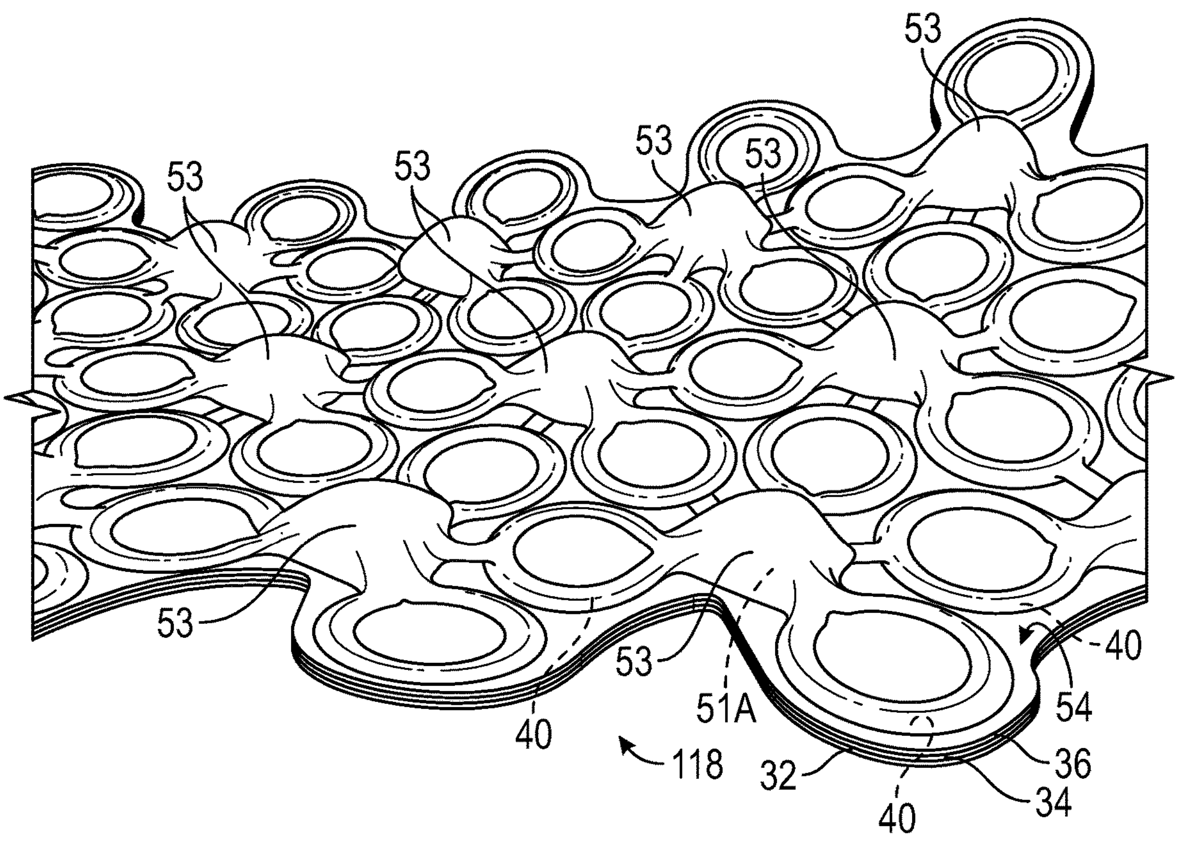
FIG. 15 is a schematic perspective and fragmentary illustration of the midsole system of FIGS. 13-14.

FIGS. 11-12 show one example of a midsole system 18A with a group of interconnected cushioning units 19, referred to with reference numbers 19A1, 19B1, and 19C1. Each of the cushioning units is identical to cushioning unit 19 shown and described with respect to FIG. 2. The second sealed chambers 40 of the respective cushioning units are fluidly connected with one another by fluid channels 43 formed by and between the second and third polymeric sheets 34, 36. In the embodiments shown, dual channels 43 are shown between the cushioning units 19A1, 19B1, 19C1. As is evident in FIG. 12, the domed lower surfaces 28 of the respective cushioning units 19A1, 19B1, 19C1 protrude and extend away from the second sealed chambers 40. Additional channels 43A, 43B in communication with the second sealed chamber 40 of the cushioning unit 19A1 are shown with a seal 51, closing off the interconnected cushioning units 19A1, 19B1, 19C1, so that no other cushioning units can communicate with those of the interconnected cushioning units 19A1, 19B1, 19C1.

FIGS. 13-16 show another embodiment of a midsole system 118 for a sole structure of an article of footwear. The midsole system 118 comprises a plurality of cushioning units 19 as described with respect to FIGS. 2-8. The cushioning units 19 are all interconnected cushioning units as they are effectively interconnected with one another via the channels 43 shown between various adjacent cushioning units 19. Only some of the cushioning units 19 and channels 43 are labelled for clarity in the drawings.

The midsole system 118 also comprises two sets of linking chambers 51A, 51B. The linking chambers 51A link (i.e., fluidly-connect) the second sealed chambers 40 of at least some of the laterally-surrounding cushioning units 19. Stated differently, for each linking chamber 51A, at least some of the interconnected cushioning units 19 laterally surround the linking chamber 51A. The respective second sealed chamber 40 of each of these laterally-surrounding interconnected cushioning units 19 is in fluid communication with the linking chamber 51A via a respective channel 43. The linking chambers 51A do not have the bond 42 between the second polymeric sheet 34 and the third polymeric sheet 36, so they create upward-extending domes 53 at the upper surface 54 of the third polymeric sheet 36, as best seen in the perspective view of FIG. 15. The domes 53 extend above the remainder of the upper surface 54.

The linking chambers 51B link (i.e., fluidly-connect) the first sealed chambers 38 of at least some of the laterally-surrounding cushioning units 19. Stated differently, for each linking chamber 51B, at least some of the interconnected cushioning units 19 laterally surround the linking chamber 51B. The respective first sealed chamber 38 of each of these laterally-surrounding, interconnected cushioning units 19 is in fluid communication with the linking chamber 51B via a respective channel 43B. The linking chambers 51B create downward-extending domes 55 at the lower surface 57 of the first polymeric sheet 32, as best seen in the FIG. 16. The domes 55 extend generally in a similar manner as the domed lower surfaces 28 of the linked, laterally surrounding cushioning units 19.

The linking chambers 51A permit the second chambers 40 of the laterally surrounding cushioning units 19 to more quickly and evenly distribute and react to a compressive load on any one or more of the linked, laterally surrounding chambers 40. Similarly, the linking chambers 51B permit the first chambers 38 of the laterally surrounding cushioning units 19 to more quickly and evenly distribute and react to a compressive load on any one or more of the linked, laterally surrounding chambers 38.

Figure 17:
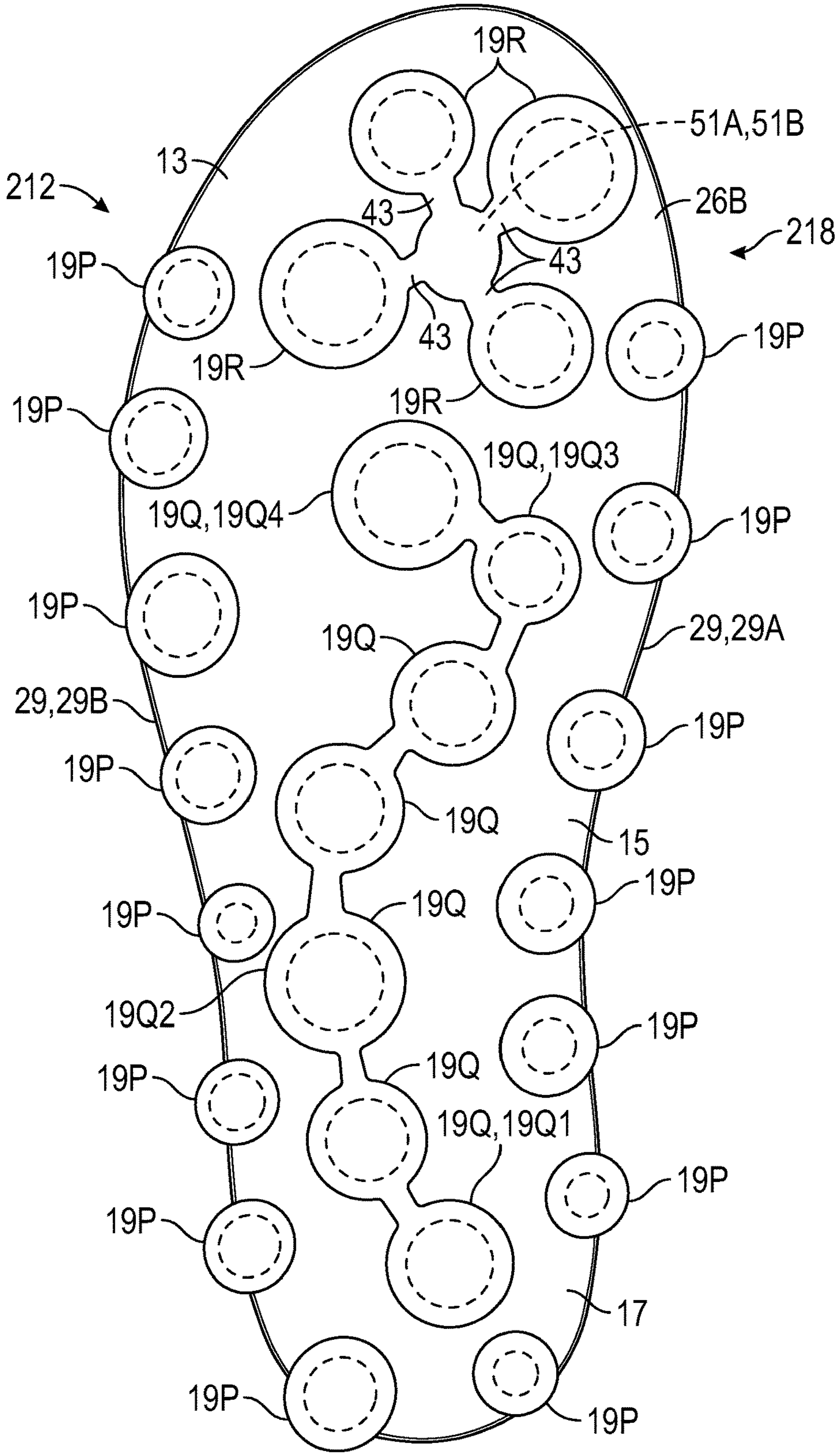
FIG. 17 is a schematic illustration in bottom view of a sole structure with an embodiment of a midsole system.

FIG. 17 shows another embodiment of a sole structure 212 for an article of footwear. The sole structure 212 includes a midsole system 218 that comprises a plurality of cushioning units 19 as described with respect to FIGS. 2-8. The plurality of cushioning units 19 include both fluidly isolated cushioning units 19P, and different groups of interconnected cushioning units 19Q and 19R. The cushioning units 19P, 19Q, and 19R are referred to with reference numeral 19 when discussing features common to each of the cushioning units 19A-19H. Each of the cushioning units 19 is partially nested in a respective recess of an overlaying third cushioning layer 26B, as discussed with respect to cushioning layers 26 and 26A. More specifically, the plurality of cushioning units include multiple isolated cushioning units 19P each disposed adjacent a periphery 29 of the sole structure 212, and each fluidly-isolated from all other ones of the plurality of cushioning units 19. A first group of interconnected cushioning units 19R and a second group of interconnected cushioning units 19Q are disposed inward of the isolated cushioning units 19P relative to the periphery 29. Stated differently, the multiple isolated cushioning units 19P are disposed between the periphery 29 and the interconnected sets of cushioning units 19Q, 19R. By isolating each peripheral cushioning unit 19P, each peripheral cushioning unit 19P can maintain a stiffness response independent of the progression of foot loading. For example, each peripheral cushioning unit 19P may be configured and pressurized to provide a relatively stiff response, providing stability to discourage overpronation and/or underpronation (supination).

Figure 16:
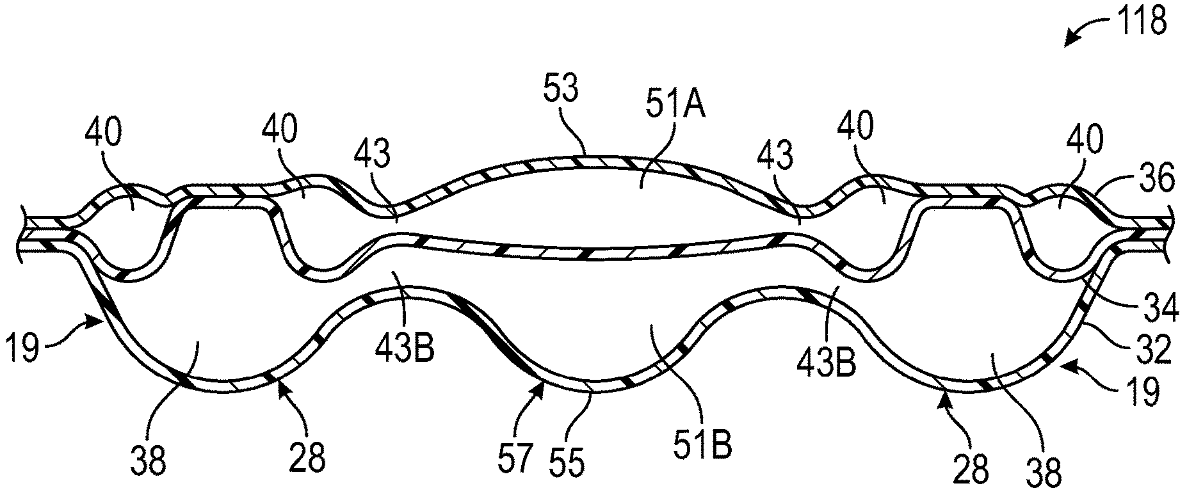
FIG. 16 is a schematic cross-sectional illustration of the midsole system of FIG. 13 taken at lines 16-16 in FIG. 13.

The first group of interconnected cushioning units 19R is in the forefoot region 13, and each are interconnected via channels 43 and linking chambers 51A, 51B as described with respect to FIG. 16, so that all of the first chambers 38 are fluidly connected, and all of the second chambers 40 are fluidly connected. The first group of interconnected cushioning units 19R extend only in the forefoot region 13, and can be tuned with inflation pressures in the linked first chambers 38, and the linked second chambers 40 suitable for toe-off.

The second group of interconnected cushioning units 19Q is disposed in the heel region 17 and the midfoot region 15 and each is fluidly-isolated from the first group 19R and from the peripheral cushioning units 19P. The cushioning units 19Q are interconnected via channels 43 and linking chambers 51A, 51B as described with respect to FIG. 16, so that all of the first chambers 38 are fluidly connected, and all of the second chambers 40 are fluidly connected. The interconnected cushioning units 19Q of the second group are arranged in a serpentine shape. The serpentine shape may also be referred to as an "S" shape. The serpentine shape winds from the rearmost unit 19Q1 forward toward the lateral side at unit 19Q2, then forward toward the medial side at unit 19Q3, then finally back toward the center at unit 19Q4 in progressing forward from the heel region, tracking the loading pattern of a typical foot strike and forward roll. The loading pattern of the foot roll can push some of the gas in the respective sealed chambers 38, 40 of the second group of cushioning units 19Q from the heel toward the midfoot, allowing the pressure at the heel 17 at impact to be lower than the loaded pressure of the midfoot 15 in the same interconnected chambers 38, 40.

Figure 18:
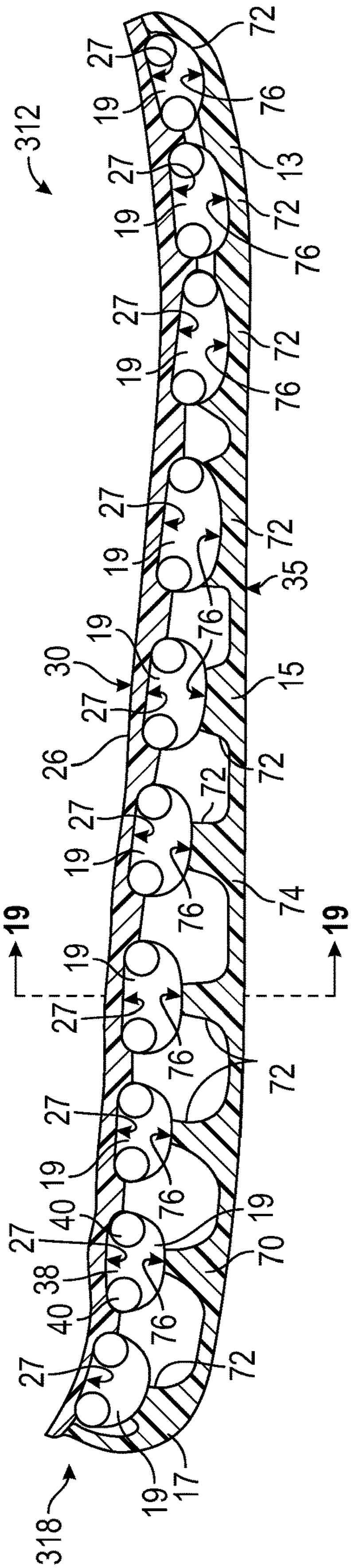
FIG. 18 is a schematic cross-sectional illustration of a sole structure with an embodiment of a midsole system and taken at lines 18-18 in FIG. 20.
Figure 19:
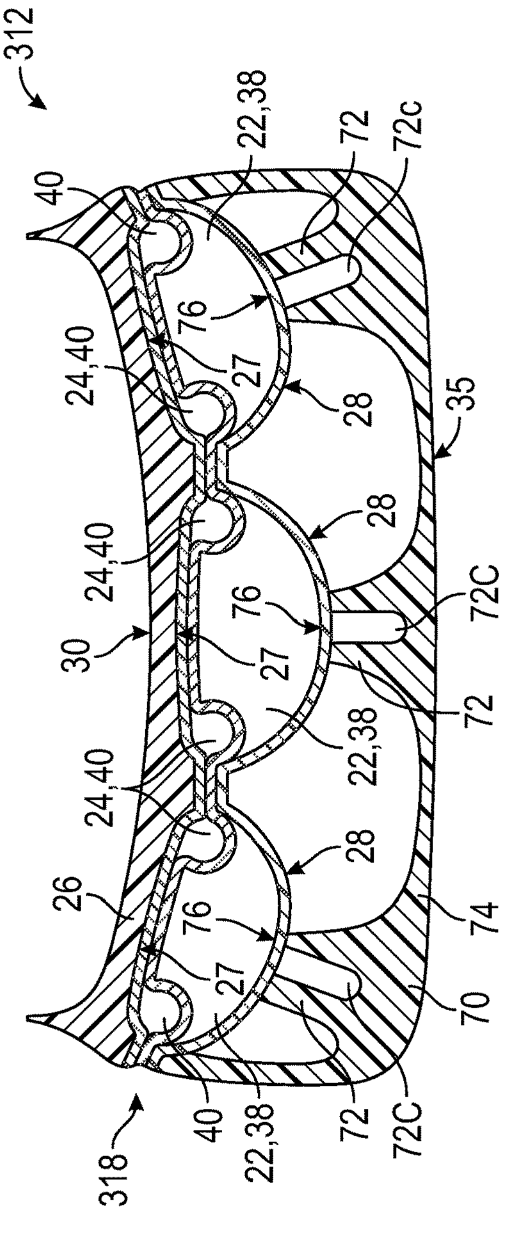
FIG. 19 is a schematic cross-sectional illustration of the sole structure of FIG. 18 taken at lines 19-19 in FIG. 18.
Figure 20:
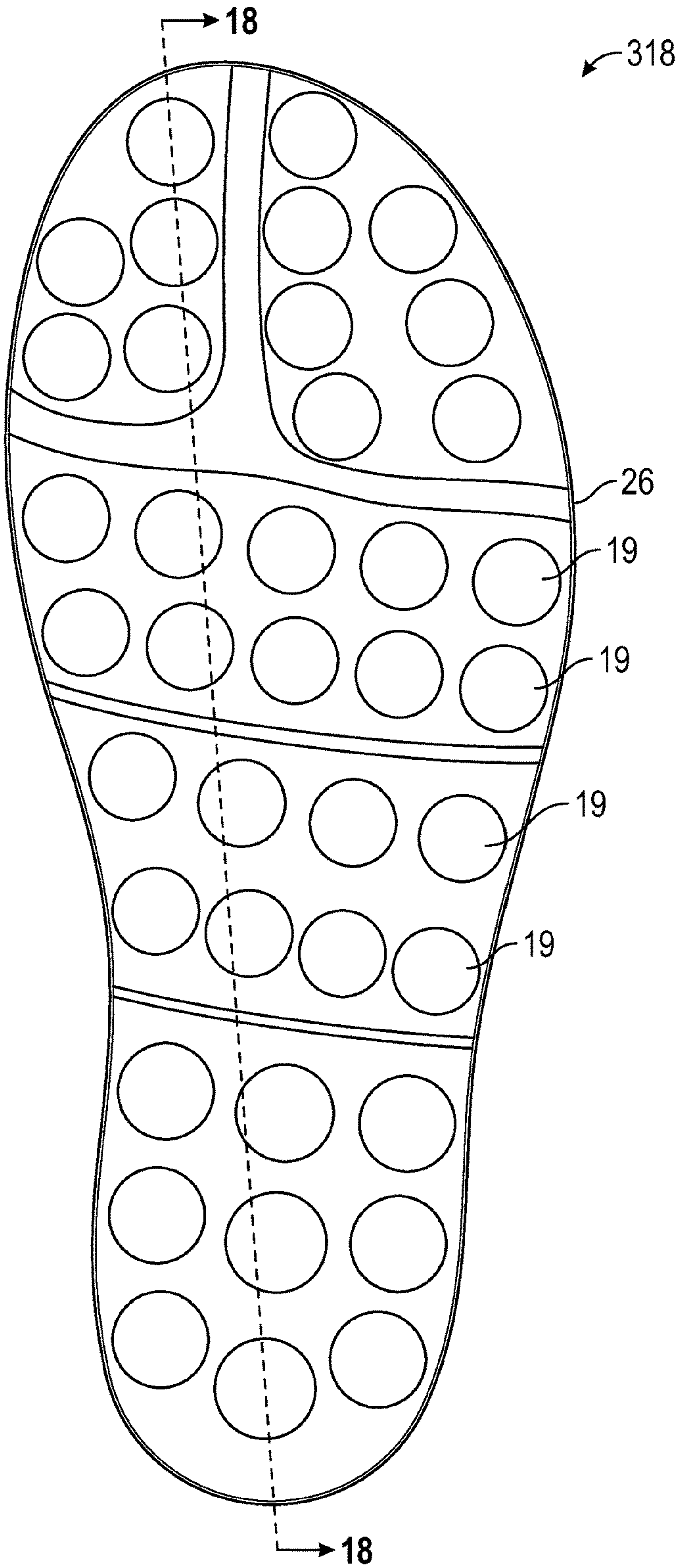
FIG. 20 is a schematic illustration in bottom view of a sole structure with an embodiment of a midsole system.

FIGS. 18-20 show another embodiment of a sole structure 312 that includes a midsole system 318 comprising a plurality of cushioning units 19 each described as described with respect to FIGS. 2-8. As shown in FIG. 18, each cushioning unit 19 is partially nested in a recess 27 in the bottom surface of the cushioning layer 26 as described herein. As shown in the bottom view of the midsole system 318 in FIG. 20 (with the layer 70 removed), each cushioning unit 19 is shown fluidly isolated from each other cushioning unit. However, some or all of the cushioning units may be interconnected by channels 43 and/or linking chambers, as described herein.

The sole structure 312 includes an additional cushioning layer 70 underlying the plurality of cushioning units 19. The additional cushioning layer 70 may be another layer of the midsole system, or may be an outsole, or a combination of a midsole layer and an outsole. As shown, the cushioning layer 70 serves as an outsole, and forms the ground contact surface 35. The additional cushioning layer 70 includes a plurality of stanchions 72 extending generally upward from a base 74 of the cushioning layer 70. The stanchions 72 are spaced apart from one another in correspondence with relative spacing of the cushioning units 19 such that the stanchions 72 can interface with the cushioning units 19 in a one-to-one ratio. Stated differently, the stanchions 72 are paired with the cushioning units 19. Each stanchion 72 may be generally round in cross-section perpendicular to its length. The center 72C of each stanchion may be hollowed out, as shown in FIG. 19 in order to reduce weight.

Each stanchion 72 interfaces with the domed lower surface 28 of a respective one of the plurality of cushioning units 19. Each stanchion 72 has a concave upper surface 76

(also referred to herein as the stanchion interface area) that cups at least a portion of the domed lower surface 28 of the respective one of the plurality of cushioning units 19. Under compressive loading of a cushioning unit 19, the domed lower surface 28 of the first cushioning layer 38 is compressed against the stanchion 72.

The stanchions 72 are configured to affect the cushioning response of the sole structure 312 as the foot strikes with an impact in the heel region 17, and the wearer's weight moves forward from heel to toe. For example, the stanchions 72 decrease in height from the heel region to the forefoot region, as shown in FIG. 18. In other words, the stanchions 72 in the heel region 17 extend further from the base 74 than those in the midfoot region 15 and the forefoot region 13. The stanchions 72 also increase in width, at least in width relative to the width of the overlying cushioning unit 19 or both, from the heel region 17 to the forefoot region 13. Generally, a narrower stanchion 72 relative to a domed lower surface 28 of a cushioning unit 19 will allow more of the first cushioning layer 38 to collapse over the stanchion 72 under compressive loading, isolating loading to the first cushioning layer for a greater range of displacement (compression) than a wider stanchion. Assuming the first cushioning layer 38 is less stiff than the second cushioning layer 40, a narrower stanchion relative to the domed lower surface may provide a softer (less stiff) initial loading response. Similarly, a shorter stanchion 72, such as in the forefoot region 13, allows less displacement of the cushioning unit 19 prior to the domed lower surface 28 of the cushioning unit bottoming out relative to the stanchion, providing a stiffer initial loading response relative to a taller stanchion.

The interface area of the stanchion 72 (i.e., the surface 76 where it contacts and cups the domed lower surface 28) to the total area of the domed lower surface 28 governs how the first cushioning layer 22 can deform (compress). Generally, a larger ratio of the area of surface 76 to the total area of the domed lower surface 28 (i.e., a larger ratio of the interface area to total area) results in a stiffer response of the cushioning unit 19 by minimizing the ability of the first cushioning layer 22 to deform over the stanchion 72. In one or more embodiments, a ratio of stanchion interface area 76 to total area of the domed lower surface 28 for each of the plurality of cushioning units 19 may be greater on average for the forefoot cushioning units (i.e., the four cushioning units 19 furthest to the right in FIG. 18) interfacing with the forefoot stanchions 72 than for the heel cushioning units interfacing with the heel stanchions 72. Accordingly, the less stiff first cushioning layer 38 affects cushioning over a greater range of displacement in the heel region 17 than in the forefoot region 13, providing a relatively stiffer response in the forefoot region, as is appropriate for supporting toe-off.

Figure 21:
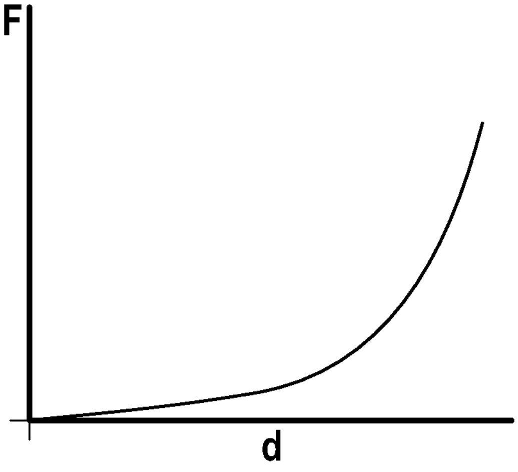
FIG. 21 is a plot of force versus displacement during dynamic compressive loading of the heel portion of the sole structure of FIG. 18.
Figure 22:
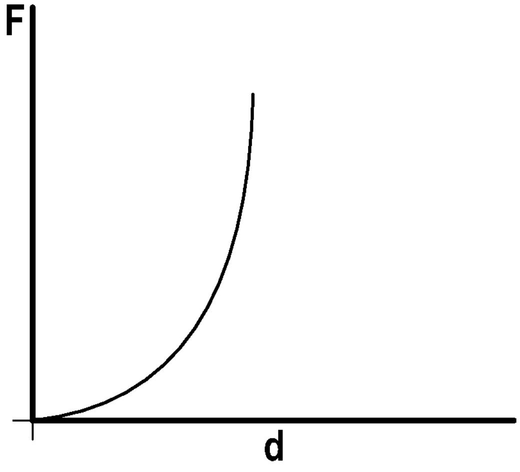
FIG. 22 is a plot of force versus displacement during dynamic compressive loading of the midfoot portion of the sole structure of FIG. 18.
Figure 23:
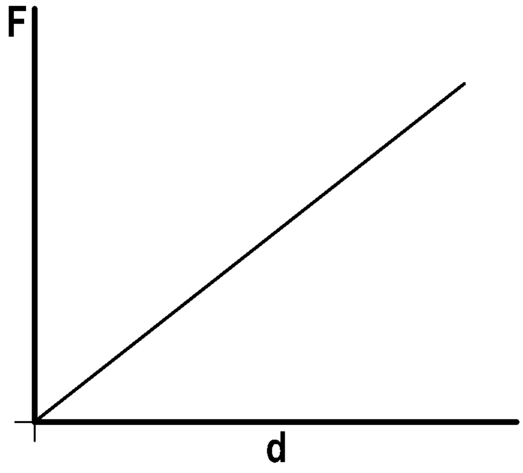
FIG. 23 is a plot of force versus displacement during dynamic compressive loading of the forefoot portion of the sole structure of FIG. 18.

The increase in compressive force with vertical displacement of the sealed chambers 38 by the corresponding stanchions 72 (i.e., stiffness) in the heel region 17 is illustrated in FIG. 21, in the midfoot region in FIG. 22, and in the forefoot region in FIG. 23. FIG. 21 illustrates that the relatively tall stanchions and low ratio of interface area 76 to total area of the cushioning unit 19 results in a relatively low, linear stiffness for a relatively large amount of vertical displacement in the heel region. The nonlinear portion of the curve in FIG. 21 begins when the cushioning units 19 bottom out against the base 74. FIG. 22 illustrates that the somewhat shorter and wider stanchions 72 in the midfoot region 15 result in a quicker transition to a higher, nonlinear stiffness in the midfoot region 15 than in the heel region 17. FIG. 23 illustrates that the nearly one-to-one ratio of the interface area 76 and domed surface 28 results in a fast-loading, energy efficient linear stiffness greater than the stiffness of the linear portion of the stiffness in the heel region and midfoot region, as is appropriate for toe-off. In a nonlimiting example, the stanchions 72 can be 10 mm diameter at the rear of the heel region 17, while the cushioning units 19 are 29 mm in diameter. The width of the stanchions gradually progress to 20 mm in the midfoot region 15, and then to 25 mm in the forefoot region 13. The stanchions 72 may be smaller in diameter in the forefoot region 13, such as 25 mm to match the diameter of the overlying cushioning unit 19 supported thereon.

Figure 24:
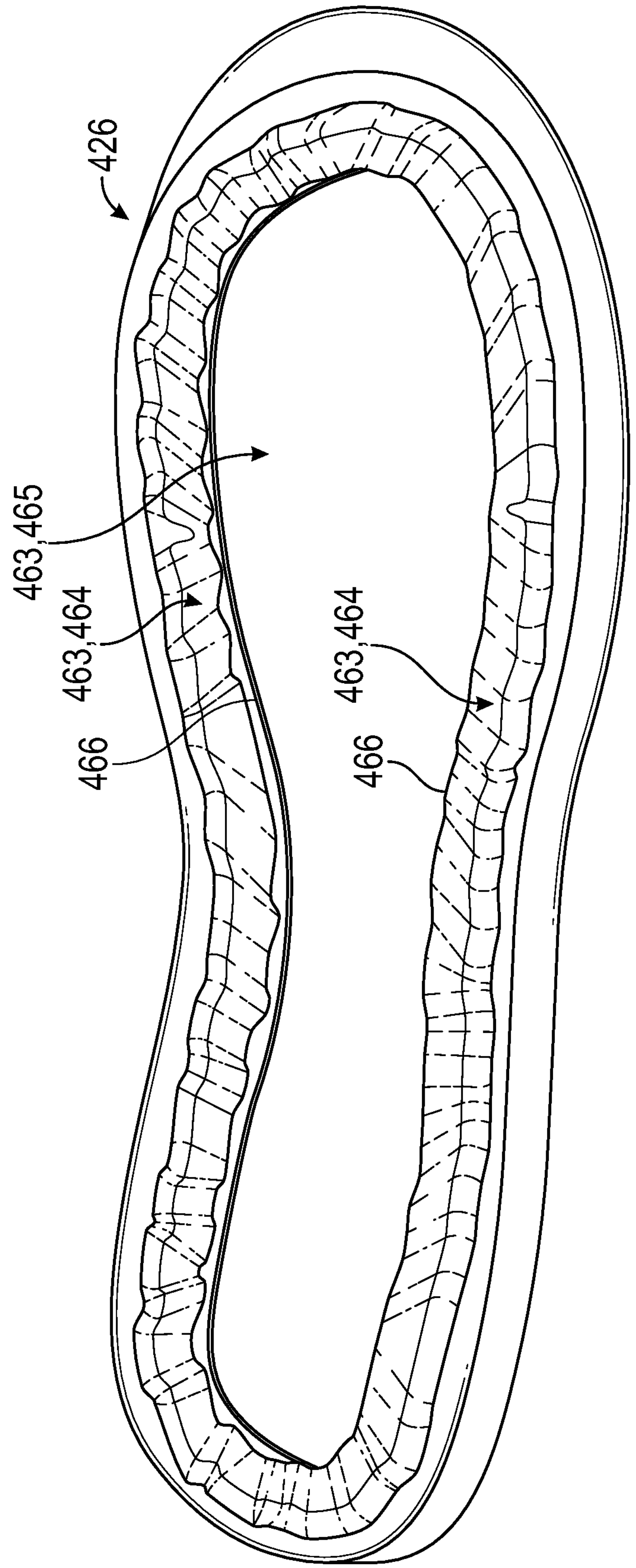
FIG. 24 is a schematic perspective illustration of a bottom surface of a sole layer of a midsole system of FIG. 25
Figure 25:
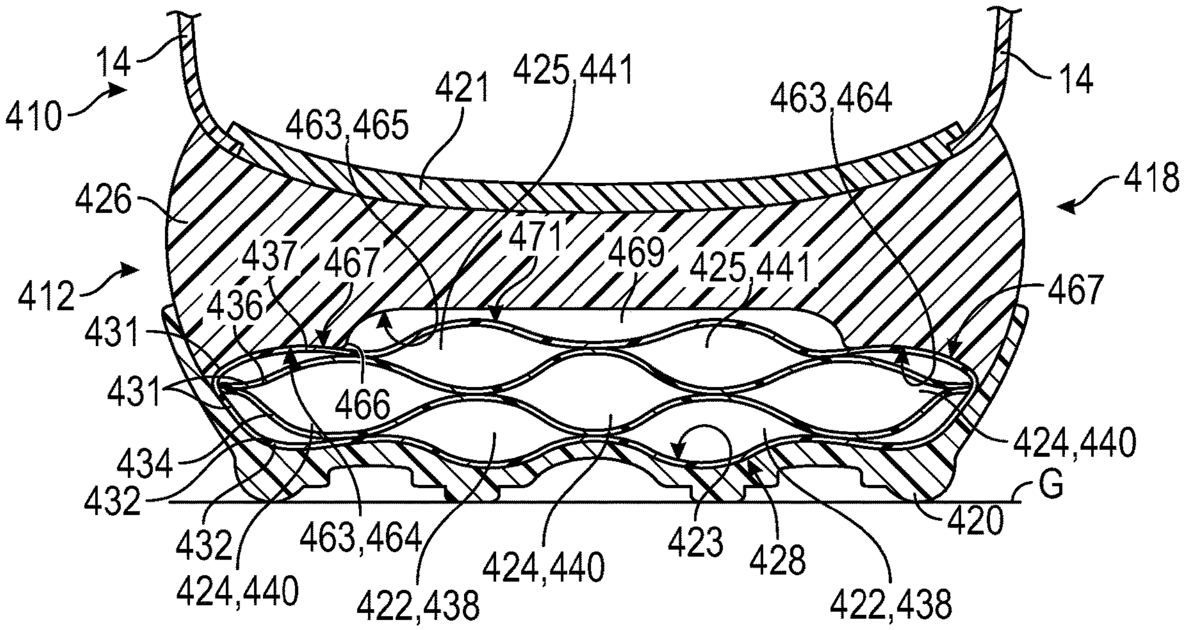
FIG. 25 is a schematic cross-sectional illustration of an embodiment of an article of footwear having a sole structure with a midsole system in an unloaded state.
Figure 26:
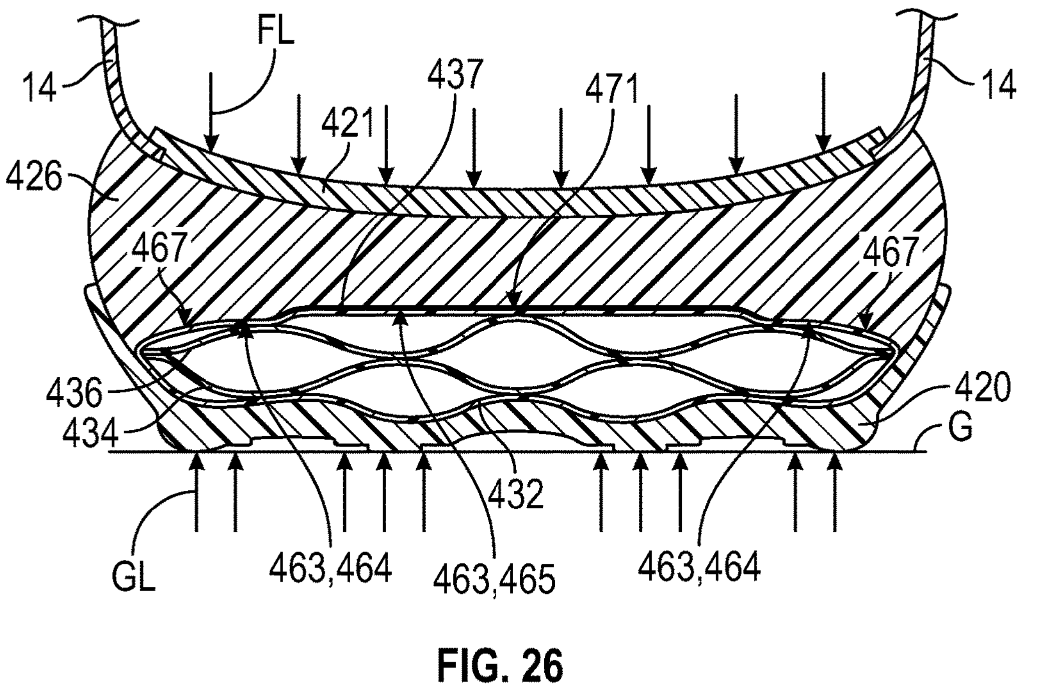
FIG. 26 is a schematic cross-sectional illustration of the article of footwear of FIG. 25 with the sole structure under compressive loading.

FIG. 24 shows a sole layer 426 included in the sole structure 412 of the article of footwear 410 of FIGS. 25-26. The sole structure 412 comprises a midsole system 418 having a bladder 431 comprising four stacked polymeric sheets 432, 434, 436, 437 bonded to one another and defining a first cushioning layer 422, a second cushioning layer 424, and a third cushioning layer 425, each cushioning layer comprising a sealed chamber retaining gas in isolation from each other sealed chamber. The four stacked polymeric sheets include a first polymeric sheet 432, a second polymeric sheet 434, a third polymeric sheet 436, and a fourth polymeric sheet 437. The first cushioning layer 422 is formed by the first and second polymeric sheets 432, 434, which form and define a first sealed chamber 438 bounded by the first polymeric 432 and the second polymeric sheet 434. The second polymeric sheet 434 and the third polymeric sheet 436 form and define a second sealed chamber 440 bounded by the second polymeric sheet 434 and the third polymeric sheet 436. The third cushioning layer 425 includes a third sealed chamber 441 that is formed, defined, and bounded by the third polymeric sheet 436 and the fourth polymeric sheet 437. The first, second, third, and fourth polymeric sheets 432, 434, 436, and 437 are a material that is impervious to gas, such as air, nitrogen, or another gas. This enables the first sealed chamber 438 to retain a gas at a first predetermined pressure, the second sealed chamber 440 to retain a gas at a second predetermined pressure, and the third sealed chamber 441 to retain a gas at a third predetermined pressure.

The sole layer 426 overlies the bladder 431 and is configured with a bottom surface 463 having an outer peripheral portion 464 and a central portion 465 surrounded by the outer peripheral portion 464. As shown in FIG. 24, the outer peripheral portion 464 extends around the front, the rear, the medial side, and the lateral side of the sole layer 426, and completely surrounds the central portion 465. The central portion 465 is recessed in the bottom surface 463 further than the outer peripheral portion 464, such that a ridge 466 generally defines a boundary between the portions 464, 465. An insole 421 overlies the sole layer 426, and a footwear upper 14 is secured to the sole structure 412.

As shown in FIG. 25, the outer peripheral portion 464 is mated with an upper surface 467 of bladder 431 in an unloaded state of the sole structure 412, and the central portion 465 is at least partially spaced apart from the upper surface 467 of the bladder 431 in the unloaded state of the sole structure 412. Stated differently, the outer peripheral portion 464 of the surface 463 has a complete and constant interface with the entire area of the outer peripheral portion of the bladder 431 (i.e., is geometrically "keyed" to the corresponding outer peripheral portion of the bladder 431), while the central portion 465 is not keyed to the bladder. This configuration allows greater displacement of the bladder 431 relative to the central portion 465 than the outer peripheral portion 464 prior to compression of the bladder 431 under a compressive load on the sole structure 412. Compression of the outer peripheral portion 464, by contrast, begins immediately under a compressive load due to the keyed outer peripheral portion 464. An immediate, relatively high stiffness may thus be achieved at the outer peripheral portion 464, in order to provide stability to counteract foot tendencies for overpronation and supination.

Because the central portion 465 is not keyed to the bladder 431, one or more gaps 469 exist between the top surface 471 of the bladder 431 and the central portion 465 of the surface 463 of the sole layer 426. This allows some vertical displacement of the sole layer 426 and the bladder 431 relative to one another under a compressive load, as shown in FIG. 26. The central portion 465 may achieve a softer (less stiff) initial cushioning response as the sole structure 412 initially compresses until the top surface 471 of the bladder 431 conforms to the central portion 465 of the bottom surface 463 of the sole layer 426 after the initial stage of compressive loading, presenting an initially soft ride (low stiffness) to the overlying central portion of the foot.

The sole structure 412 also includes an underlying sole layer 420, such as an outsole or an additional midsole layer, which underlies the bladder 431. In the embodiment shown, the sole layer 420 is an outsole. An upper surface 423 of the underlying sole layer is mated with a bottom surface 428 of the bladder 431 in both the unloaded state and under compressive loading of the sole structure 412.

Figure 27:
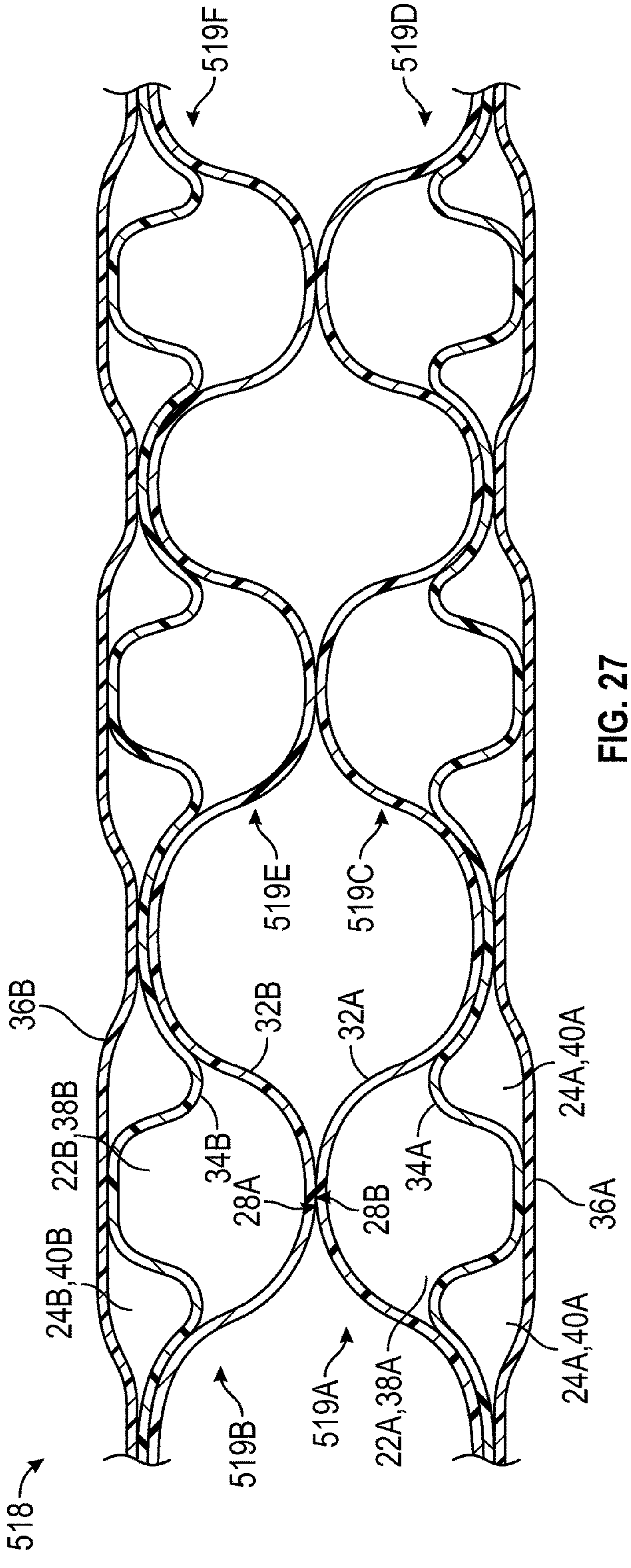
FIG. 27 is a schematic cross-sectional illustration of an embodiment of a midsole system for an article of footwear.

FIG. 27 shows a midsole system 518 for a sole structure for an article of footwear. The midsole system 518 has a first cushioning unit 519A and a second cushioning unit 519B. Each of the cushioning units 519A, 519B is identical to the cushioning unit 19 shown and described with respect to FIG. 2, with the outsole 20 being optional. Moreover, each of the cushioning units is connected to other cushioning units. For example, the first cushioning unit 519A is connected to cushioning units 519C and 519D, and may be in fluid communication with either of both of cushioning units 519C, 519D. FIG. 27 is a fragmentary view of the midsole system 518, and other cushioning units may also be connected to cushioning unit 519A. The second cushioning unit 519B is connected to cushioning units 519E and 519F, and may be in fluid communication with either of both of cushioning units 519E, 519F. FIG. 27 is a fragmentary view of the midsole system 518, and other cushioning units may also be connected to cushioning unit 519B.

As described with respect to cushioning unit 19, each cushioning unit 519A, 519B includes a first, a second, and a third polymeric sheet, indicated as sheets 32A, 34A, and 36A for the first cushioning unit 519A, and sheets 32B, 34B, and 36B for the second cushioning unit 519B. The first cushioning unit 519A comprises a first cushioning layer 22A that includes a first sealed chamber 38A, and a second cushioning layer 24A that includes a second sealed chamber 40A. The first sealed chamber 38A and the second sealed chamber 40A each retain gas in isolation from one another. The second cushioning unit 519B comprises a first cushioning layer 22B that includes a first sealed chamber 38B, and a second cushioning layer 24B that includes a second sealed chamber 40B. The first sealed chamber 38B and the second sealed chamber 40B each retain gas in isolation from one another. As described herein with respect to cushioning unit 19, the first cushioning layer 22A, 22B of each cushioning unit 519A, 519B has a domed surface 28A, 28B extending away from the respective second cushioning layer 24A, 24B, and the second cushioning layer 24A, 24B is annular and borders a central portion of the first cushioning layer 22A, 22B.

The first cushioning unit 519A is inverted and the second cushioning unit 519B is stacked on the inverted first cushioning unit 519A such that the first cushioning layer 22A of the first cushioning unit 519A interfaces with and underlies the first cushioning layer 22B of the second cushioning unit 519B. More specifically, the domed surface 28A of the first cushioning unit 519A (now an upper surface, as the first cushioning unit 519A is inverted) interfaces with the domed lower surface 28B of the second cushioning unit 519B. The cushioning units 519A, 519B are thus disposed in an inverted relationship to one another. The cushioning units 519C, 519E, and the cushioning units 519D and 519F interface in a like manner. In embodiments in which the first cushioning layers 22A, 22B are less stiff than the second cushioning layers 24A, 24B, such as when the pressure of the gas in the first sealed chambers 38A, 38B of the respective first cushioning layers 22A, 22B are less than the pressure of the gas in the second sealed chambers 40A, 40B of the respective second cushioning layers 24A, 24B in an unloaded state of the midsole system 518, stacking the cushioning units 519A, 519B so that the least stiff first cushioning layers 22A, 22B interface with one another will effectively allow a greater range of displacement of the sole structure in an initial (first) stage of compression that is affected only by the least stiff first cushioning layers 22A, 22B than if a stiffer layer were disposed vertically between the first cushioning layers 22A, 22B.

Figure 28:
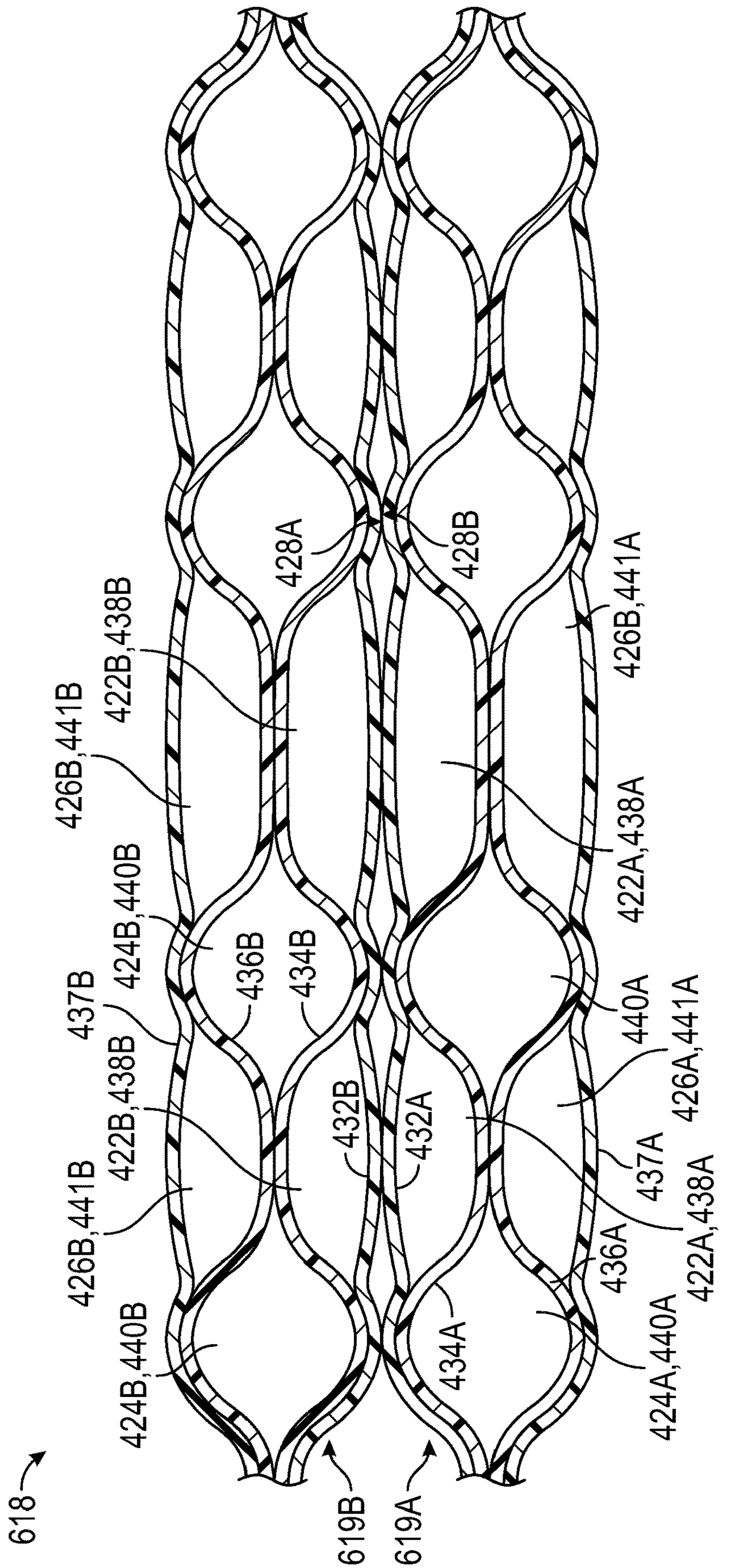
FIG. 28 is a schematic cross-sectional illustration of an embodiment of a midsole system for an article of footwear.

FIG. 28 shows another embodiment of a midsole system 618 for a sole structure for an article of footwear with vertically stacked cushioning units. The midsole system 618 has a first cushioning unit 619A and a second cushioning unit 619B. Each of the cushioning units 619A, 619B has four polymeric sheets, three cushioning layers, and three sealed chambers, constructed identically to those of the bladder 431 shown and described with respect to FIG. 25. More specifically, each cushioning layer 619A and 619B includes the four stacked polymeric sheets. The four stacked polymeric sheets 432A, 434A, 436A, 437A of the first cushioning unit 619A are bonded to one another and defining a first cushioning layer 422A, a second cushioning layer 424A, and a third cushioning layer 426A, each cushioning layer comprising a sealed chamber 438A, 440A, 441A, respectively, retaining gas in isolation from each other sealed chamber. The four stacked polymeric sheets 432B, 434B, 436B, 437B of the second cushioning unit 619B are bonded to one another and defining a first cushioning layer 422B, a second cushioning layer 424B, and a third cushioning layer 426B, each cushioning layer comprising a sealed chamber 438B, 440B, 441B, respectively, retaining gas in isolation from each other sealed chamber. FIG. 28 is a fragmentary view of the midsole system 618.

The first cushioning unit 619A is inverted and the second cushioning unit 619B is stacked on the inverted first cushioning unit 619A such that the first cushioning layer 422A of the first cushioning unit 619A interfaces with and underlies the first cushioning layer 422B of the second cushioning unit 619B. More specifically, the surface 428A of the first cushioning unit 619A interfaces with the surface 428B of the second cushioning unit 619B. The cushioning units 619A, 619B are thus disposed in an inverted relationship to one another. In embodiments in which the first cushioning layers 422A, 422B are less stiff than the second cushioning layers 424A, 424B, such as when the pressure of the gas in the first sealed chamber 438A, 438B of the respective first cushioning layer 422A, 422B is less than the pressure of the gas in the respective second sealed chamber 440A, 440B of the second cushioning layers 424A, 424B in an unloaded state of the midsole system 618, stacking the cushioning units 619A, 619B so that the least stiff first cushioning layers 422A, 422B interface with one another will effectively allow a greater range of displacement of the midsole system 618 in an initial (first) stage of compression that is affected only by the least stiff first cushioning layers 422A, 422B than if a stiffer layer were disposed vertically between the first cushioning layers 422A, 422B.

Figure 29:
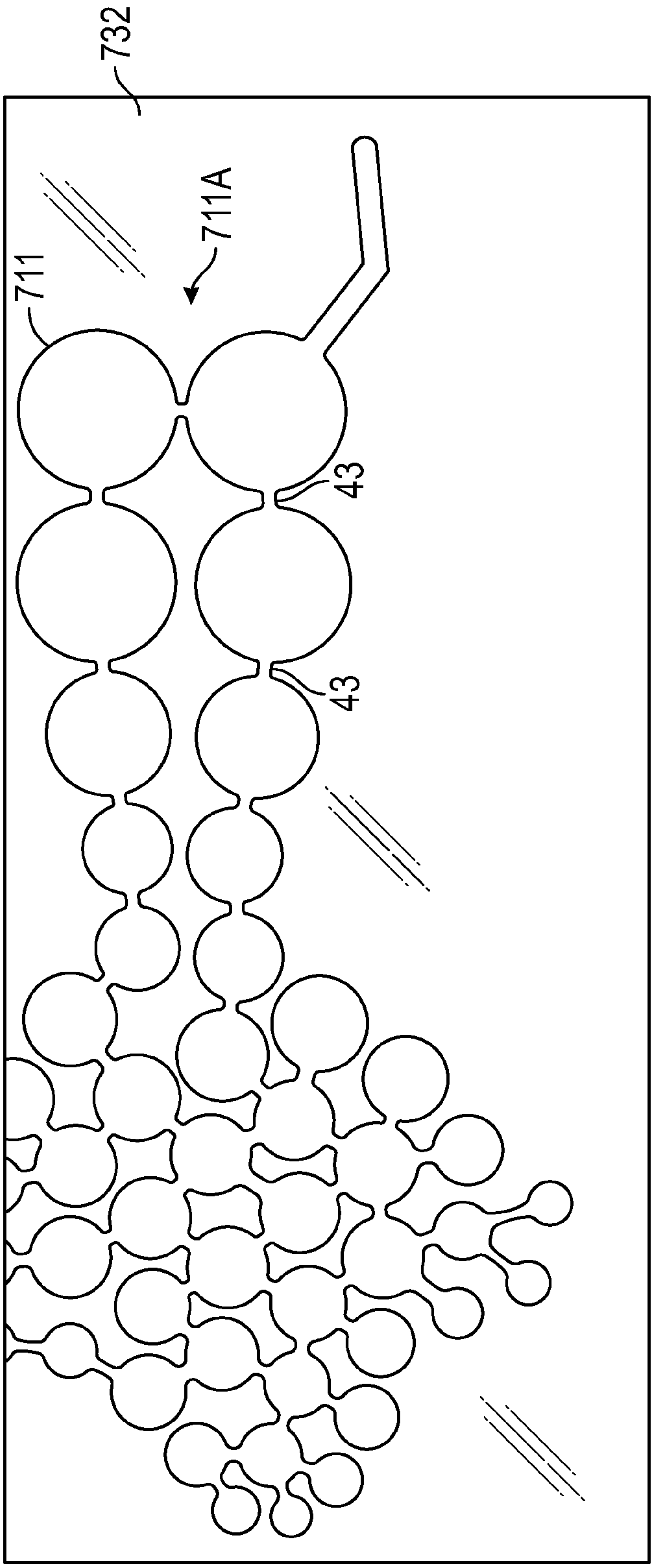
FIG. 29 is a schematic plan view illustration of a first polymeric sheet for a midsole system showing a pattern of anti-weld material.
Figure 30:
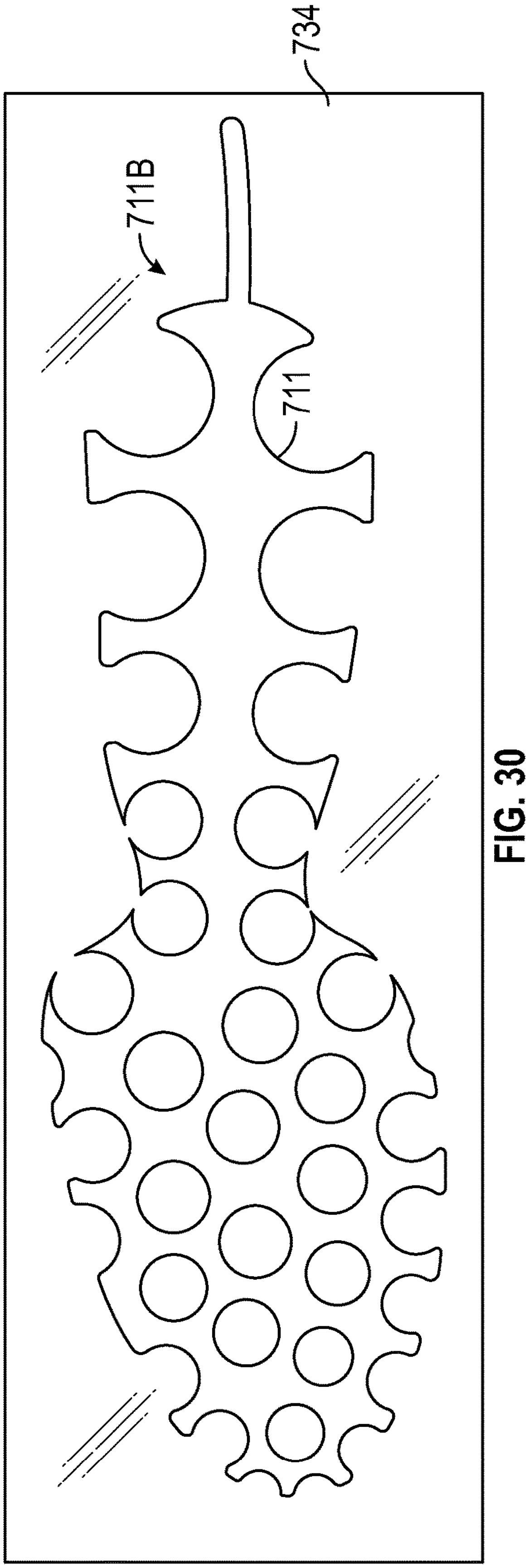
FIG. 30 is a schematic plan view illustration of a second polymeric sheet for a midsole system showing a pattern of anti-weld material.
Figure 31:
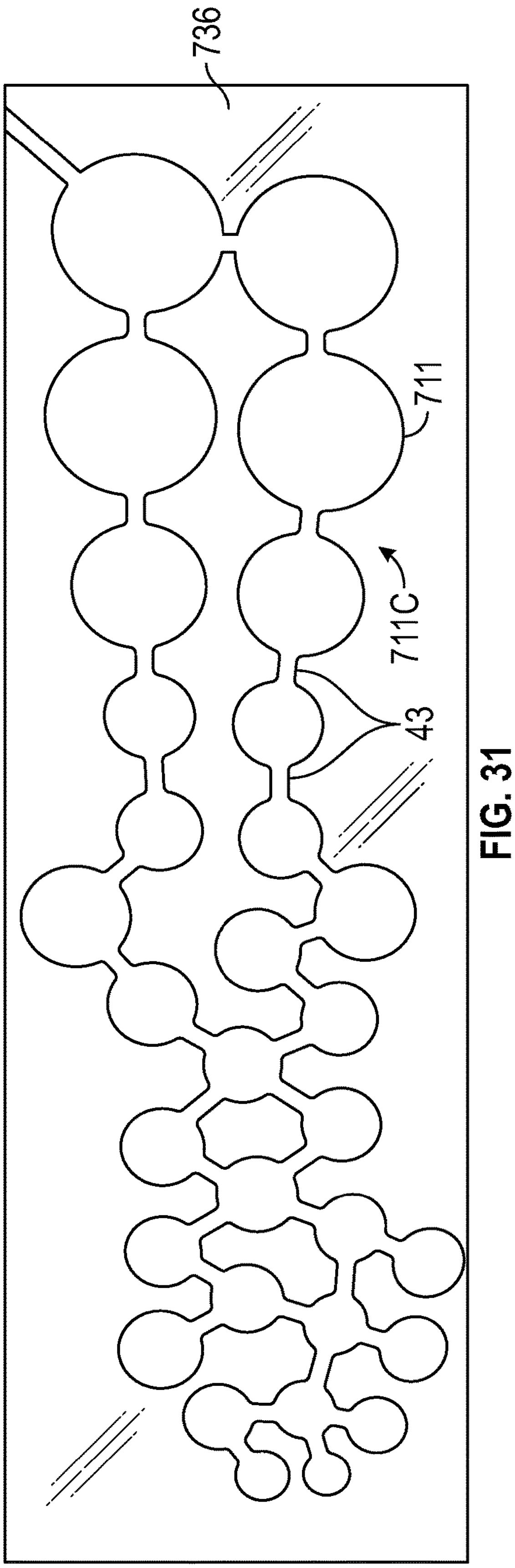
FIG. 31 is a schematic plan view illustration of a third polymeric sheet for a midsole system showing a pattern of anti-weld material.

FIGS. 29-31 show polymeric sheets 732, 734, 736 with patterns of anti-weld material 711 disposed on the sheets. The pattern 711A is disposed on the top surface of the first sheet 732. The pattern 711B is disposed on both upper and lower surfaces of the second sheet 734. The pattern 711C is disposed on the lower surface of the third sheet 736. If the sheets are then stacked in order of sheets 732, 734, 736, with sheet 732 at the bottom, the sheets 732, 734, 736 will bond to one another in all adjacent surfaces not covered with the anti-weld material 711. The patterns 711A, 711B, 711C will result in a series of the cushioning units 19 with the domed lower surfaces 28. The channels 43 on the lower sheet 732 indicate that the first chambers 38 of the resulting cushioning units 19 will be in fluid communication. The channels 43 on the third sheet 736 indicate that the second chambers 40 of the resulting cushioning units will be in fluid communication. Only some of the channels 43 are labeled in the drawings.

In one non-limiting example, the various embodiments of midsoles disclosed herein may provide energy return from about 59% to about 82%, when energy return is measured as the percent restoration of initial drop height of an impact tester, or is measured with a mechanical tester such as an INSTRON® tester available from Instron Corporation, Norwood, Mass.

To assist and clarify the description of various embodiments, various terms are defined herein. Unless otherwise indicated, the following definitions apply throughout this specification (including the claims). Additionally, all references referred to are incorporated herein in their entirety.

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear" or "footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. As used in the description and the accompanying claims, unless stated otherwise, a value is considered to be "approximately" equal to a stated value if it is neither more than 5 percent greater than nor more than 5 percent less than the stated value. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" refers to a direction extending a length of a component. For example, a longitudinal direction of an article of footwear extends between a forefoot region and a heel region of the article of footwear. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" refers to a direction extending a width of a component. For example, a transverse direction of an article of footwear extends between a lateral side and a medial side of the article of footwear. The transverse direction or axis may also be referred to as a lateral direction or axis or a mediolateral direction or axis.

The term "vertical" refers to a direction generally perpendicular to both the lateral and longitudinal directions. For example, in cases where a sole structure is planted flat on a ground surface, the vertical direction may extend from the ground surface upward. It will be understood that each of these directional adjectives may be applied to individual components of a sole structure. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, toward the bottom of a component and may generally point towards the bottom of a sole structure of an article of footwear.

The "interior" of an article of footwear, such as a shoe, refers to portions at the space that is occupied by a wearer's foot when the article of footwear is worn. The "inner side" of a component refers to the side or surface of the component that is (or will be) oriented toward the interior of the component or article of footwear in an assembled article of footwear. The "outer side" or "exterior" of a component refers to the side or surface of the component that is (or will be) oriented away from the interior of the article of footwear in an assembled article of footwear. In some cases, other components may be between the inner side of a component and the interior in the assembled article of footwear. Similarly, other components may be between an outer side of a component and the space external to the assembled article of footwear. Further, the terms "inward" and "inwardly" refer to the direction toward the interior of the component or article of footwear, such as a shoe, and the terms "outward" and "outwardly" refer to the direction toward the exterior of the component or article of footwear, such as the shoe. In addition, the term "proximal" refers to a direction that is nearer a center of a footwear component, or is closer toward a foot when the foot is inserted in the article of footwear as it is worn by a user. Likewise, the term "distal" refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A sole structure for an article of footwear comprising:
a midsole system having:
a bladder comprising four stacked polymeric sheets bonded to one another and defining a first cushioning layer, a second cushioning layer, and a third cushioning layer, each cushioning layer comprising a sealed chamber retaining gas in isolation from each other sealed chamber; and
a sole layer overlying the bladder and configured with a bottom surface having an outer peripheral portion and a central portion surrounded by the outer peripheral portion;
wherein the central portion of the bottom surface of the sole layer is recessed in the sole layer further than the outer peripheral portion of the bottom surface of the sole layer;
wherein the outer peripheral portion of the bottom surface of the sole layer extends around a front, a rear, a medial side, and a lateral side of the sole layer, surrounding the central portion;
wherein a ridge defines a boundary between the central portion of the bottom surface of the sole layer and the outer peripheral portion;
wherein the outer peripheral portion of the bottom surface of the sole layer is mated with an upper surface of bladder in an unloaded state of the sole structure, and the central portion of the bottom surface of the sole layer is spaced apart from the upper surface of the bladder in the unloaded state of the sole structure such that a single gap between a top surface of the bladder and the central portion of the bottom surface of the sole layer extends from the ridge at the medial side of the sole layer to the ridge at the lateral side of the sole layer and the top surface of the bladder is not in contact with the central portion of the bottom surface of the sole layer at the single gap in the unloaded state of the sole structure.

2. The sole structure of claim 1, wherein the bladder conforms to the central portion of the bottom surface of the sole layer under compressive loading.

3. The sole structure of claim 1, wherein the sole layer extends in a forefoot region, a midfoot region, and a heel region of the sole structure.

4. The sole structure of claim 1, wherein the outer peripheral portion of the bottom surface of the sole layer has a complete and constant interface with an outer peripheral portion of the upper surface of the bladder above the sealed chamber of the third cushioning layer such that the ridge is above the sealed chamber of the third cushioning layer.

5. The sole structure of claim 1, further comprising:
an additional sole layer underlying the bladder; wherein an upper surface of the additional sole layer is mated with a bottom surface of the bladder in both the unloaded state and under compressive loading of the sole structure.

6. The sole structure of claim 5, wherein the additional sole layer is an outsole that wraps upward past the bladder along medial and lateral side surfaces of the sole layer.

7. The sole structure of claim 1, wherein the four stacked polymeric sheets include a first polymeric sheet, a second polymeric sheet, a third polymeric sheet, and a fourth polymeric sheet;
wherein the first polymeric sheet and the second polymeric sheet define the first cushioning layer as a first sealed chamber bounded by the first polymeric sheet and the second polymeric sheet;
wherein the second polymeric sheet and the third polymeric sheet define the second cushioning layer as a second sealed chamber bounded by the second polymeric sheet and the third polymeric sheet; and
wherein the third polymeric sheet and the fourth polymeric sheet define the third cushioning layer as a third sealed chamber bounded by the third polymeric sheet and the fourth polymeric sheet.

8. An article of footwear comprising:
a footwear upper;
a sole structure secured to the footwear upper;
wherein the sole structure includes a midsole system having:
a bladder comprising four stacked polymeric sheets bonded to one another and defining a first cushioning layer, a second cushioning layer, and a third cushioning layer, each cushioning layer comprising a sealed chamber retaining gas in isolation from each other sealed chamber; and a sole layer overlying the bladder and configured with a bottom surface having an outer peripheral portion and a central portion surrounded by the outer peripheral portion;

wherein the central portion of the bottom surface of the sole layer is recessed in the sole layer further than the outer peripheral portion of the bottom surface of the sole layer;

wherein the outer peripheral portion of the bottom surface of the sole layer extends around a front, a rear, a medial side, and a lateral side of the sole layer, surrounding the central portion;

wherein a ridge defines a boundary between the central portion of the bottom surface of the sole layer and the outer peripheral portion;

wherein the outer peripheral portion of the bottom surface of the sole layer is mated with an upper surface of bladder in an unloaded state of the sole structure, and the central portion of the bottom surface of the sole layer is spaced apart from the upper surface of the bladder in the unloaded state of the sole structure such that a single gap between a top surface of the bladder and the central portion of the bottom surface of the sole layer extends from the ridge at the medial side of the sole layer to the ridge at the lateral side of the sole layer and the top surface of the bladder is not in contact with the central portion of the bottom surface of the sole layer at the single gap in the unloaded state of the sole structure.

9. The article of footwear of claim 8, wherein the bladder conforms to the central portion of the bottom surface of the sole layer under compressive loading.

10. The article of footwear of claim 8, wherein the sole layer extends in a forefoot region, a midfoot region, and a heel region of the article of footwear; and wherein the outer peripheral portion of the bottom surface of the sole layer surrounds the central portion in the forefoot region, the midfoot region, and the heel region.

11. The article of footwear of claim 8, further comprising:

an outsole underlying the bladder; wherein an upper surface of the outsole is mated with a bottom surface of the bladder in both the unloaded state and under compressive loading of the sole structure.

12. The article of footwear of claim 11, wherein the outsole wraps upward past the bladder along medial and lateral side surfaces of the sole layer.

13. The article of footwear of claim 8, wherein the footwear upper is secured to the sole layer.

* * * * *